United States Patent
Amano et al.

(10) Patent No.: US 10,937,181 B2
(45) Date of Patent: Mar. 2, 2021

(54) INFORMATION PROCESSING APPARATUS, OBJECT RECOGNITION APPARATUS, DEVICE CONTROL SYSTEM, MOVABLE BODY, IMAGE PROCESSING METHOD, AND COMPUTER-READABLE RECORDING MEDIUM

(71) Applicant: Ricoh Company, Ltd., Tokyo (JP)

(72) Inventors: Seiya Amano, Kanagawa (JP); Hiroyoshi Sekiguchi, Kanagawa (JP); Soichiro Yokota, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 267 days.

(21) Appl. No.: 16/130,062

(22) Filed: Sep. 13, 2018

(65) Prior Publication Data
US 2019/0012798 A1    Jan. 10, 2019

Related U.S. Application Data

(63) Continuation of application No. PCT/JP2016/086640, filed on Dec. 8, 2016.

(30) Foreign Application Priority Data

Mar. 15, 2016 (JP) .............................. JP2016-051447

(51) Int. Cl.
*G06T 7/593* (2017.01)
*G01C 3/06* (2006.01)
(Continued)

(52) U.S. Cl.
CPC ............. *G06T 7/593* (2017.01); *B60W 30/08* (2013.01); *G01C 3/06* (2013.01); *G06K 9/00825* (2013.01);
(Continued)

(58) Field of Classification Search
None
See application file for complete search history.

(56) References Cited

U.S. PATENT DOCUMENTS 8,824,779 B1 *   9/2014   Smyth ..................... G06T 7/593
                                                                  382/154
8,963,963 B2 *   2/2015   Hildreth ............... H04N 13/239
                                                                  345/676
(Continued)

FOREIGN PATENT DOCUMENTS

JP    07-129898    5/1995
JP    2003-150938  5/2003
(Continued)

OTHER PUBLICATIONS

Ling-Wei Lee, Faeznor Diana binti Zainordin (2013). Stereo Vision Auto-Alignment and the Unsupervised Search for Objects of Interest With Depth Estimation, ECMS 2013 Proceedings edited by: W. Rekdalsbakken, R. T. Bye, H. Zhang, European Council for Modeling and Simulation. doi:10.7148/2013-0817 (Year: 2013).*
(Continued)

*Primary Examiner* — Andrae S Allison
(74) *Attorney, Agent, or Firm* — Xsensus LLP

(57) ABSTRACT

According to an embodiment, an information processing apparatus includes a calculating unit and a discarding unit. The calculating unit is configured to calculate a distance between two objects, detected based on distance information on the objects that are overlapped in detection areas of the objects, in a depth direction in the detection areas. The discarding unit is configured to determine whether each of the two objects in the detection areas is to be discarded by using a method that corresponds to the distance calculated by the calculating unit.

19 Claims, 20 Drawing Sheets

(51) Int. Cl.
  *G08G 1/16* (2006.01)
  *G06T 7/00* (2017.01)
  *B60W 30/08* (2012.01)
  *G06T 7/11* (2017.01)
  *H04N 13/204* (2018.01)
  *G06K 9/00* (2006.01)
  *G06T 7/20* (2017.01)

(52) U.S. Cl.
  CPC ............... *G06T 7/00* (2013.01); *G06T 7/11* (2017.01); *G06T 7/20* (2013.01); *G08G 1/16* (2013.01); *H04N 13/204* (2018.05)

(56) References Cited

U.S. PATENT DOCUMENTS

| | | | |
|---|---|---|---|
| 10,325,376 B2* | 6/2019 | Smits | G06K 9/00771 |
| 10,672,141 B2* | 6/2020 | Motohashi | G06T 7/70 |
| 2003/0091228 A1 | 5/2003 | Nagaoka et al. | |
| 2007/0053584 A1* | 3/2007 | Nagaoka | G06K 9/00805 382/154 |
| 2010/0202657 A1* | 8/2010 | Salgian | G06K 9/00369 382/103 |
| 2010/0231717 A1 | 9/2010 | Sasaki et al. | |
| 2011/0050714 A1 | 3/2011 | Sekiguchi et al. | |
| 2011/0228043 A1* | 9/2011 | Masuda | H04N 13/296 348/36 |
| 2011/0255741 A1* | 10/2011 | Jung | G06K 9/00369 382/103 |
| 2012/0242835 A1 | 9/2012 | Li et al. | |
| 2014/0078258 A1* | 3/2014 | Chandraker | H04N 13/204 348/46 |
| 2015/0049195 A1 | 2/2015 | Ishigaki et al. | |
| 2015/0109421 A1* | 4/2015 | Piminov | H04N 13/239 348/47 |
| 2015/0243043 A1 | 8/2015 | Guan | |
| 2015/0294160 A1 | 10/2015 | Takahashi et al. | |
| 2015/0332103 A1 | 11/2015 | Yokota et al. | |
| 2015/0334269 A1 | 11/2015 | Yokota et al. | |
| 2015/0338516 A1* | 11/2015 | Kijima | G06K 9/62 701/1 |
| 2015/0358610 A1* | 12/2015 | Takahashi | G06T 7/593 348/47 |
| 2016/0014406 A1* | 1/2016 | Takahashi | G06T 7/246 348/148 |
| 2016/0019429 A1 | 1/2016 | Ishigaki et al. | |
| 2016/0131579 A1* | 5/2016 | Sekiguchi | B60S 1/0844 701/36 |
| 2016/0261848 A1* | 9/2016 | Sekiguchi | G06K 9/6215 |
| 2016/0301912 A1 | 10/2016 | Saitoh et al. | |
| 2016/0307054 A1* | 10/2016 | Takemura | H04N 5/2171 |
| 2016/0307055 A1* | 10/2016 | Nishijima | H04N 13/106 |
| 2016/0335778 A1* | 11/2016 | Smits | G01P 3/36 |
| 2018/0357495 A1* | 12/2018 | Watanabe | G06T 7/593 |
| 2020/0219323 A1* | 7/2020 | Varshney | H04L 51/20 |

FOREIGN PATENT DOCUMENTS

| | | |
|---|---|---|
| JP | 2014-032542 | 2/2014 |
| JP | 2014-146267 | 8/2014 |
| JP | 2015-143966 | 8/2015 |
| JP | 2015-179302 | 10/2015 |
| JP | 2015-207281 | 11/2015 |
| WO | WO 2014/077170 A1 | 5/2014 |
| WO | 2017/115732 | 7/2017 |

OTHER PUBLICATIONS

International Search Report dated Jan. 24, 2017 in PCT/JP2016/086640 filed Dec. 8, 2016 with English Translation.
Written Opinion dated Jan. 24, 2017 in PCT/JP2016/086640 filed Dec. 8, 2016.
Extended European Search Report dated Feb. 21, 2019 in the corresponding European Application No. 16894575.6 9 pages.
Wu, M. et al., "Stereo based ROIs Generation for Detecting Pedestrians in Close Proximity", 2014 IEEE 17th International Conference on Intelligent Transportation Systems (ITSC), XP032685662, Oct. 8, 2014, pp. 1929-1934.
Iloie, A. et al., "UV disparity based obstacle detection and pedestrian classification in urban traffic scenarios", 2014 IEEE 10th International Conference on Intelligent Computer Communication and Processing (ICCP), XP055554644, Sep. 1, 2014, 7 pages.
Wang, B. et al., "Multiple Obstacle Detection and Tracking using Stereo Vision: Application and Analysis", 2014 13th International Conference on Control Automation Robotics & Vision (ICARCV), XP055555356, Dec. 1, 2014, 6 pages.

* cited by examiner

INFORMATION PROCESSING APPARATUS, OBJECT RECOGNITION APPARATUS, DEVICE CONTROL SYSTEM, MOVABLE BODY, IMAGE PROCESSING METHOD, AND COMPUTER-READABLE RECORDING MEDIUM

CROSS-REFERENCE TO RELATED APPLICATIONS

This application is a continuation of PCT international application Ser. No. PCT/JP2016/086640 filed on Dec. 8, 2016 which designates the United States, incorporated herein by reference, and which claims the benefit of priority from Japanese Patent Applications No. 2016-051447, filed on Mar. 15, 2016, incorporated herein by reference.

BACKGROUND OF THE INVENTION

1. Field of the Invention

Embodiments relate to an information processing apparatus, an object recognition apparatus, a device control system, a movable body, an image processing method, and a computer-readable recording medium.

2. Description of the Related Art

Conventionally, body structures of automobiles, and the like, have been developed in terms of safety of automobiles as to how pedestrians and occupants in an automobile are protected when the automobile crashes into pedestrians. Furthermore, in recent years, technologies of detecting persons and automobiles at high speed have been developed due to improvements in information processing technologies and image processing technologies. By using these technologies, some automobiles have been developed to prevent crashes before happens by automatically applying a brake before an automobile crashes into an object. For automatic control of automobiles, the distance to an object such as person or different automobile needs to be measured with accuracy and, for this purpose, distance measurement using millimeter-wave radar and laser radar, distance measurement using a stereo camera, and the like, have been put into practical use.

When a stereo camera is used as a technology for recognizing objects, disparity of each object appearing in two luminance images captured on the right and left is derived to generate a disparity image and pixels having a similar disparity value is grouped together to recognize the object. Here, by extracting a disparity cluster in a disparity image, the height, horizontal width, and depth of an object and the position of an object in three dimensions may be detected.

As the technology for recognizing objects described above, there is a disclosed technology in which a pedestrian recognition area where the presence of a pedestrian is recognized in image data is identified and a pedestrian score indicating the degree of certainty of a pedestrian is calculated (see Japanese Laid-open Patent Publication No. 2014-146267).

Typically, when objects are overlapped in a captured image, a process is conducted to exclude (discard) an object in the back from the control target (tracking target); however, it is preferable that, for example, pedestrians who run out from the back side of a different vehicle in the front are not discarded but included as the control target. Unfortunately, the technology disclosed in Japanese Laid-open Patent Publication No. 2014-146267 has a problem in that for example when a pedestrian suddenly runs out from the back of a different vehicle, or the like, it is difficult to ensure that the pedestrian is detected without being discarded and is included as the control target.

In consideration of the foregoing, there is a need to provide an information processing apparatus, an object recognition apparatus, a device control system, a movable body, an image processing method, and a computer-readable recording medium having a program that performs a discard process properly.

SUMMARY OF THE INVENTION

According to an embodiment, an information processing apparatus includes a calculating unit and a discarding unit. The calculating unit is configured to calculate a distance between two objects, detected based on distance information on the objects that are overlapped in detection areas of the objects, in a depth direction in the detection areas. The discarding unit is configured to determine whether each of the two objects in the detection areas is to be discarded by using a method that corresponds to the distance calculated by the calculating unit.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1A:
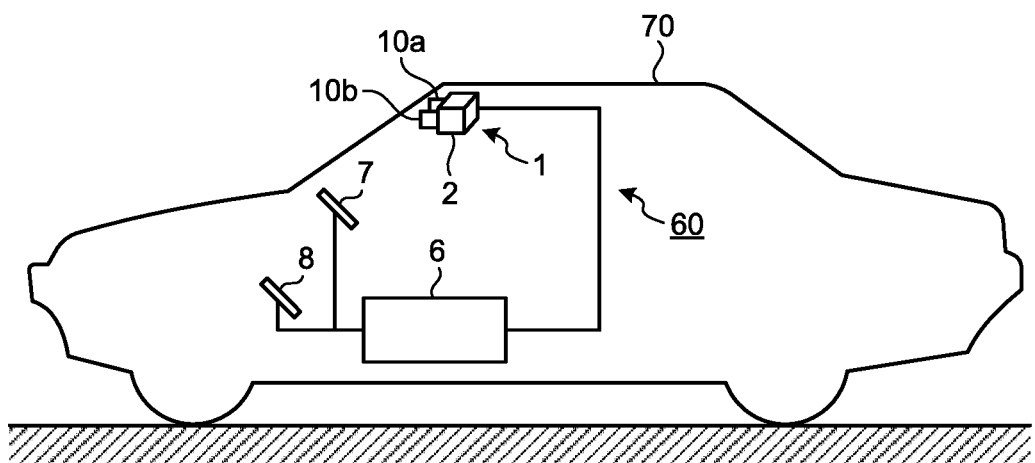
FIGS. 1A and 1B are diagrams that illustrate an example where a device control system according to an embodiment is installed in a vehicle.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

With reference to FIGS. 1A to 24, a detailed explanation is given below of an embodiment of an image processing apparatus, an object recognition apparatus, a device control system, an image processing method, and a program according to the present invention. The present invention is not limited to the embodiment below, and components in the embodiment below include the ones that may be easily developed by a person skilled in the art, substantially the same ones, and the ones in what is called a range of equivalents. Furthermore, the components may be variously omitted, replaced, modified, or combined without departing from the scope of the embodiment below.

[Schematic Configuration of Vehicle Including Object Recognition Apparatus]

Figure 1B:
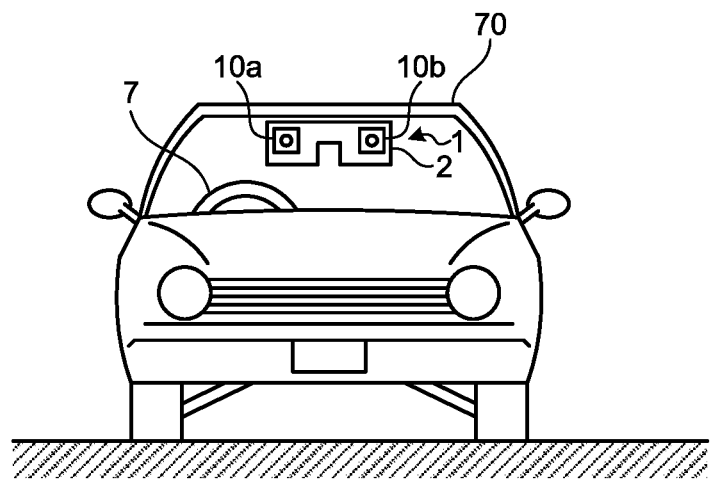

FIGS. 1A and 1B are diagrams that illustrate an example where a device control system according to the embodiment is installed in a vehicle. With reference to FIGS. 1A and 1B, an explanation is given of a case where for example a device control system 60 according to the present embodiment is installed in a vehicle 70.

FIG. 1A is a side view of the vehicle 70 with the device control system 60 installed therein, and FIG. 1B is a front view of the vehicle 70.

As illustrated in FIGS. 1A and 1B, the vehicle 70, which is an automobile, has the device control system 60 installed therein. The device control system 60 includes an object recognition apparatus 1, a vehicle control device 6 (control device), a steering wheel 7, and a brake pedal 8, provided in the vehicle interior that is an accommodation space in the vehicle 70.

The object recognition apparatus 1 has an imaging function to capture images in a traveling direction of the vehicle 70, and for example it is installed near the rearview mirror inside the front window of the vehicle 70. The object recognition apparatus 1 includes: a main body unit 2; and an imaging unit 10a and an imaging unit 10b that are fixed to the main body unit 2, and details of its configuration and operation are described later. The imaging units 10a, 10b are fixed to the main body unit 2 so as to capture an object in the traveling direction of the vehicle 70.

The vehicle control device 6 is an ECU (electronic control unit) that performs various types of vehicle control on the basis of recognition information received from the object recognition apparatus 1. On the basis of recognition information received from the object recognition apparatus 1, the vehicle control device 6 performs, as an example of the vehicle control, steering control to avoid obstacles by controlling a steering system (control target) including the steering wheel 7, brake control to stop or reduce the speed of the vehicle 70 by controlling the brake pedal 8 (control target), or the like.

The device control system 60 including the object recognition apparatus 1 and the vehicle control device 6 described above performs vehicle control such as steering control or brake control to improve driving safety of the vehicle 70.

Furthermore, as described above, the object recognition apparatus 1 captures images in front of the vehicle 70; however, this is not a limitation. That is, the object recognition apparatus 1 may be installed to capture images on the back or side of the vehicle 70. In this case, the object recognition apparatus 1 is capable of detecting the position of the following vehicle and person on the back of the vehicle 70 or a different vehicle and person on the side thereof. Furthermore, the vehicle control device 6 is capable of detecting dangers when the vehicle 70 changes a lane, merges into a lane, or the like, to perform the above-described vehicle control. Furthermore, when the vehicle control device 6 determines that there is the danger of collision when the vehicle 70 is backing to be parked, or the like, on the basis of recognition information on an obstacle on the back of the vehicle 70, output from the object recognition apparatus 1, it is capable of performing the above-described vehicle control.

[Configuration of the Object Recognition Apparatus]

Figure 2:
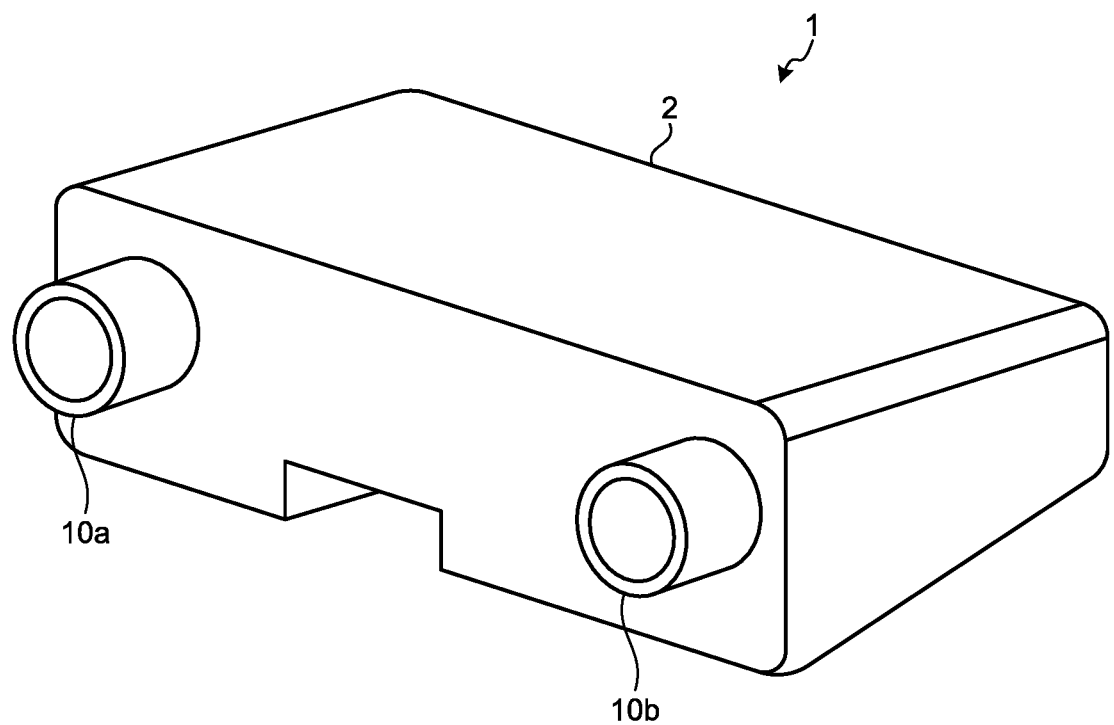
FIG. 2 is a diagram that illustrates an example of the external appearance of an object recognition apparatus according to the embodiment.

FIG. 2 is a diagram that illustrates an example of the external appearance of the object recognition apparatus according to the embodiment. As illustrated in FIG. 2, the object recognition apparatus 1 includes the main body unit 2; and the imaging unit 10a and the imaging unit 10b that are fixed to the main body unit 2, as described above. The imaging units 10a and 10b are made up of a pair of cylindrical cameras that are parallel to and are located at equivalent positions relative to the main body unit 2. Furthermore, for the convenience of explanation, the imaging unit 10a illustrated in FIG. 2 is sometimes referred to as the right camera and the imaging unit 10b as the left camera.

(Hardware Configuration of the Object Recognition Apparatus)

Figure 3:
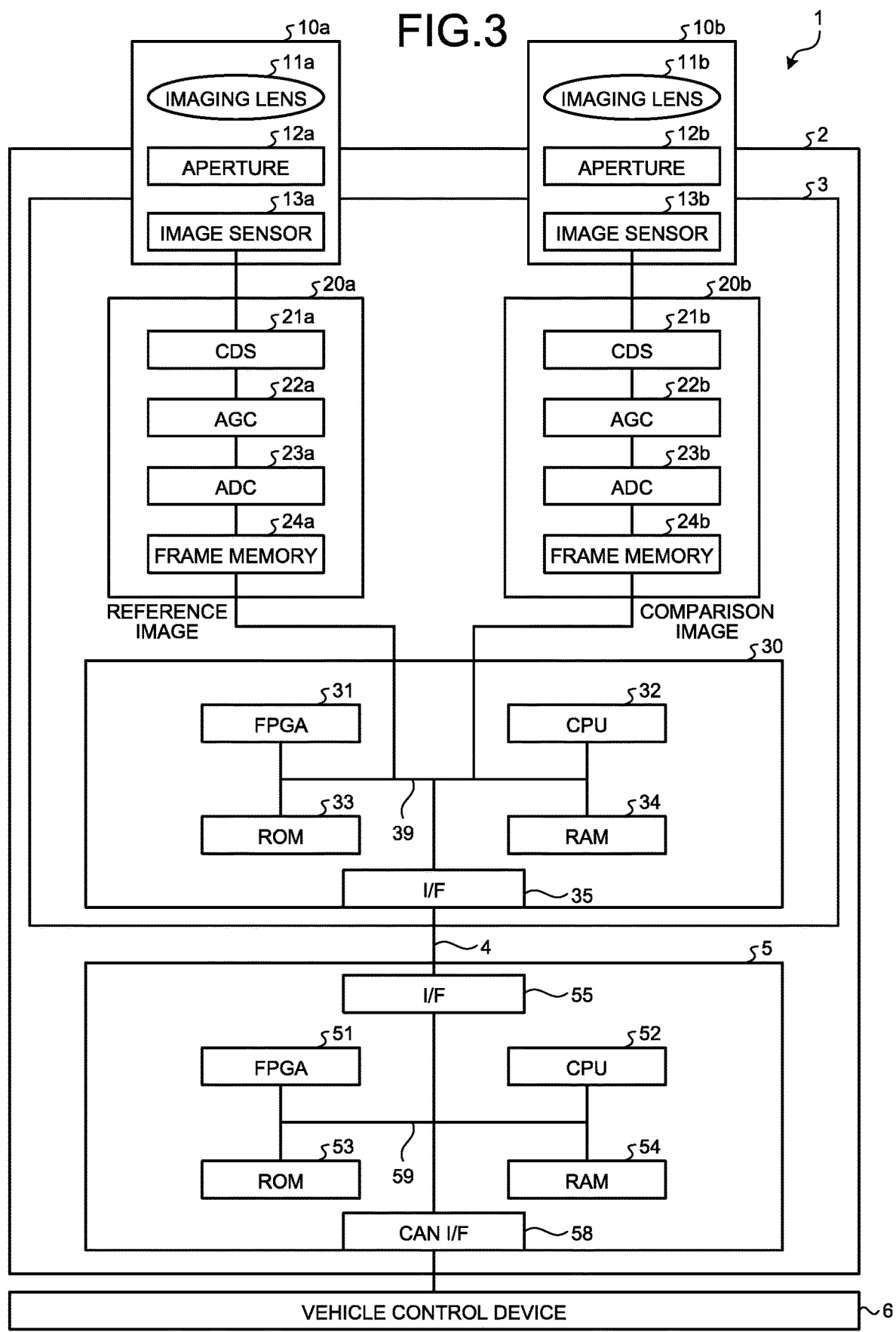
FIG. 3 is a diagram that illustrates an example of the hardware configuration of the object recognition apparatus according to the embodiment.

FIG. 3 is a diagram that illustrates an example of the hardware configuration of the object recognition apparatus according to the embodiment. With reference to FIG. 3, the hardware configuration of the object recognition apparatus 1 is explained.

As illustrated in FIG. 3, the object recognition apparatus 1 includes a disparity-value deriving unit 3 and a recognition processing unit 5 inside the main body unit 2.

The disparity-value deriving unit 3 is a device that derives a disparity value dp indicating disparity with respect to an object from images obtained after the object is captured and outputs a disparity image (an example of distance information) indicating the disparity value dp of each pixel. The recognition processing unit 5 is a device that performs an object recognition process, or the like, on an object such as person or vehicle appearing in a captured image on the basis of a disparity image output from the disparity-value deriving unit 3 and outputs recognition information that is information indicating a result of the object recognition process to the vehicle control device 6.

As illustrated in FIG. 3, the disparity-value deriving unit 3 includes the imaging unit 10a, the imaging unit 10b, a signal converting unit 20a, a signal converting unit 20b, and an image processing unit 30.

The imaging unit 10a is a processing unit that captures an object in the front and generates analog image signals. The imaging unit 10a includes an imaging lens 11a, an aperture 12a, and an image sensor 13a.

The imaging lens 11a is an optical element that refracts incident light to form an image of the object on the image sensor 13a. The aperture 12a is a member that blocks part of light that has passed through the imaging lens 11a to adjust the amount of light input to the image sensor 13a. The image sensor 13a is a semiconductor device that converts light that has entered the imaging lens 11a and passed through the aperture 12a into electric analog image signals. The image sensor 13a is implemented by using solid state image sensors such as CCD (charge coupled devices) or CMOS (complementary metal oxide semiconductor).

The imaging unit 10b is a processing unit that captures the object in the front and generates analog image signals. The imaging unit 10b includes an imaging lens 11b, an aperture 12b, and an image sensor 13b. Here, the functions of the imaging lens 11b, the aperture 12b, and the image sensor 13b are the same as those of the imaging lens 11a, the aperture 12a, and the image sensor 13a described above. Furthermore, the imaging lens 11a and the imaging lens 11b are installed such that their principal surfaces are on the same plane so that the right and the left cameras capture images under the same condition.

The signal converting unit 20a is a processing unit that converts analog image signals generated by the imaging unit 10a into digital-format image data. The signal converting unit 20a includes a CDS (correlated double sampling) 21a, an AGC (auto gain control) 22a, an ADC (analog digital converter) 23a, and a frame memory 24a.

The CDS 21a removes noise from analog image signals generated by the image sensor 13a by using correlated double sampling, a differential filter in a traverse direction, a smoothing filter in a longitudinal direction, or the like. The AGC 22a performs gain control to control the intensity of analog image signals from which noise has been removed by the CDS 21a. The ADC 23a converts analog image signals whose gain has been controlled by the AGC 22a into digital-format image data. The frame memory 24a stores image data converted by the ADC 23a.

The signal converting unit 20b is a processing unit that converts analog image signals generated by the imaging unit 10b into digital-format image data. The signal converting unit 20b includes a CDS 21b, an AGC 22b, an ADC 23b, and a frame memory 24b. Here, the functions of the CDS 21b, the AGC 22b, the ADC 23b, and the frame memory 24b are the same as those of the CDS 21a, the AGC 22a, the ADC 23a, and the frame memory 24a described above.

The image processing unit 30 is a device that performs image processing on image data converted by the signal converting unit 20a and the signal converting unit 20b. The image processing unit 30 includes an FPGA (field programmable gate array) 31, a CPU (central processing unit) 32, a ROM (read only memory) 33, a RAM (random access memory) 34, an I/F (interface) 35, and a bus line 39.

The FPGA 31 is an integrated circuit, and here it performs a process to derive the disparity value dp in an image based on image data. The CPU 32 controls each function of the disparity-value deriving unit 3. The ROM 33 stores programs for image processing executed by the CPU 32 to control each function of the disparity-value deriving unit 3. The RAM 34 is used as a work area of the CPU 32. The I/F 35 is an interface for communicating with an I/F 55 in the recognition processing unit 5 via a communication line 4. As illustrated in FIG. 3, the bus line 39 is an address bus and a data bus, or the like, for connecting the FPGA 31, the CPU 32, the ROM 33, the RAM 34, and the I/F 35 such that they can communicate with one other.

Here, the image processing unit 30 includes the FPGA 31 as an integrated circuit for deriving the disparity value dp; however, this is not a limitation, and it may be an integrated circuit such as ASIC (application specific integrated circuit).

As illustrated in FIG. 3, the recognition processing unit 5 includes an FPGA 51, a CPU 52, a ROM 53, a RAM 54, the I/F 55, a CAN (controller area network) I/F 58, and a bus line 59.

The FPGA 51 is an integrated circuit, and here it performs an object recognition process on an object on the basis of disparity images, or the like, received from the image processing unit 30. The CPU 52 controls each function of the recognition processing unit 5. The ROM 53 stores programs for an object recognition process with which the CPU 52 performs an object recognition process of the recognition processing unit 5. The RAM 54 is used as a work area of the CPU 52. The I/F 55 is an interface for data communication with the I/F 35 of the image processing unit 30 via the communication line 4. The CAN I/F 58 is an interface for communicating with an external controller (e.g., the vehicle control device 6 illustrated in FIG. 3), and, for example, a bus line 59 connected to the CAN of a vehicle, or the like, is an address bus and a data bus, or the like, connecting the FPGA 51, the CPU 52, the ROM 53, the RAM 54, the I/F 55, and the CAN I/F 58 such that they can communicate with one another, as illustrated in FIG. 3.

With this configuration, after a disparity image is sent to the recognition processing unit 5 from the I/F 35 of the image processing unit 30 via the communication line 4, the FPGA 51 performs an object recognition process, or the like, on an object such as person or vehicle appearing in a captured image on the basis of the disparity image in accordance with a command from the CPU 52 of the recognition processing unit 5.

Furthermore, each of the above-described programs may be distributed by recorded in a recording medium readable by computers in the form of file that is installable and executable. The recording medium may be a CD-ROM (compact disc read only memory), SD (secure digital) memory card, or the like.

Furthermore, as illustrated in FIG. 3, the image processing unit 30 of the disparity-value deriving unit 3 and the recognition processing unit 5 are separate devices; however, this is not a limitation, and, for example, the image processing unit 30 and the recognition processing unit 5 may be the same device to generate disparity images and perform an object recognition process.

(Configuration and Operation of Functional Blocks of the Object Recognition Apparatus)

Figure 4:
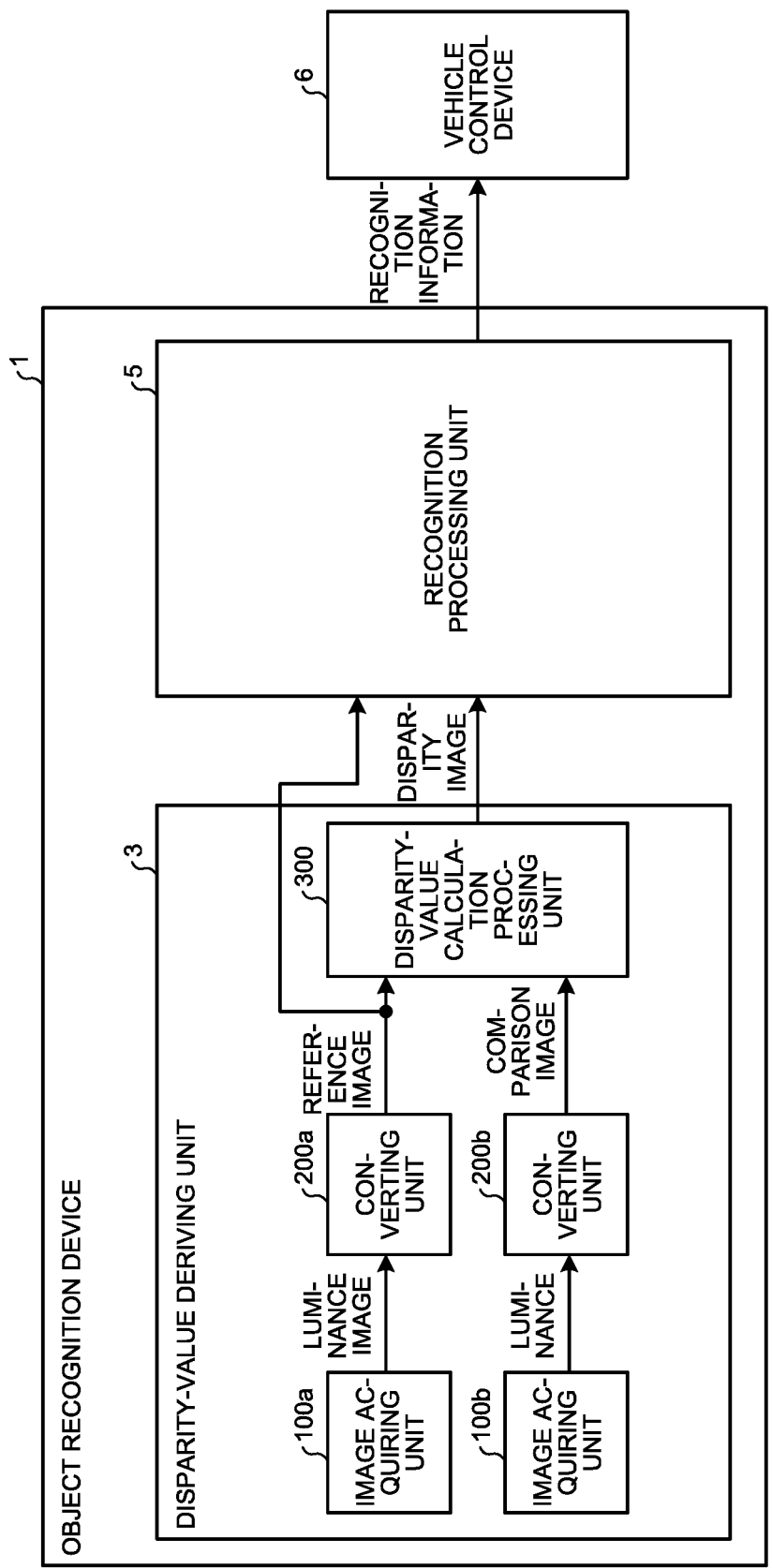
FIG. 4 is a diagram that illustrates an example of the configuration of functional blocks of the object recognition apparatus according to the embodiment.

FIG. 4 is a diagram that illustrates an example of the configuration of functional blocks of the object recognition apparatus according to the embodiment. First, with reference to FIG. 4, an explanation is given of the configuration and operation of the functional blocks in the relevant part of the object recognition apparatus 1.

Although described above with reference to FIG. 3, the object recognition apparatus 1 includes the disparity-value deriving unit 3 and the recognition processing unit 5 as illustrated in FIG. 4. Specifically, the disparity-value deriving unit 3 includes an image acquiring unit 100a (first imaging unit), an image acquiring unit 100b (second imaging unit), converting units 200a, 200b, and a disparity-value calculation processing unit 300 (generating unit).

The image acquiring unit 100a is a functional unit that captures the image of an object in the front by using the right camera, generates analog image signals, and obtains a luminance image that is an image based on the image signals. The image acquiring unit 100a is implemented by using the imaging unit 10a illustrated in FIG. 3.

The image acquiring unit 100b is a functional unit that captures the image of an object in the front by using the left camera, generates analog image signals, and obtains a luminance image that is an image based on the image signals. The image acquiring unit 100b is implemented by using the imaging unit 10b illustrated in FIG. 3.

The converting unit 200a is a functional unit that removes noise from image data on the luminance image obtained by the image acquiring unit 100a, converts it into digital-format image data, and outputs it. The converting unit 200a is implemented by using the signal converting unit 20a illustrated in FIG. 3.

The converting unit 200b is a functional unit that removes noise from image data on the luminance image obtained by the image acquiring unit 100b, converts it into digital-format image data, and outputs it. The converting unit 200b is implemented by using the signal converting unit 20b illustrated in FIG. 3.

Here, with regard to pieces of image data (hereafter, simply referred to as luminance images) on two luminance images output from the converting units 200a, 200b, the luminance image captured by the image acquiring unit 100a, which is the right camera (the imaging unit 10a), is the image data on a reference image Ia (hereafter, simply referred to as the reference image Ia) (first captured image), and the luminance image captured by the image acquiring unit 100b, which is the left camera (the imaging unit 10b), is the image data on a comparison image Ib (hereafter, simply referred to as the comparison image Ib) (second captured image). That is, the converting units 200a, 200b output the reference image Ia and the comparison image Ib, respectively, on the basis of two luminance images output from the image acquiring units 100a, 100b.

The disparity-value calculation processing unit 300 is a functional unit that derives the disparity value dp with respect to each pixel of the reference image Ia on the basis of the reference image Ia and the comparison image Ib received from the converting units 200a, 200b, respectively, and generates a disparity image in which the disparity value dp is applied to each pixel of the reference image Ia. The disparity-value calculation processing unit 300 outputs the generated disparity image to the recognition processing unit 5.

The recognition processing unit 5 is a functional unit that recognizes (detects) an object on the basis of the reference image Ia and the disparity image received from the disparity-value deriving unit 3 and performs a tracking process on the recognized object.

Figure 5:
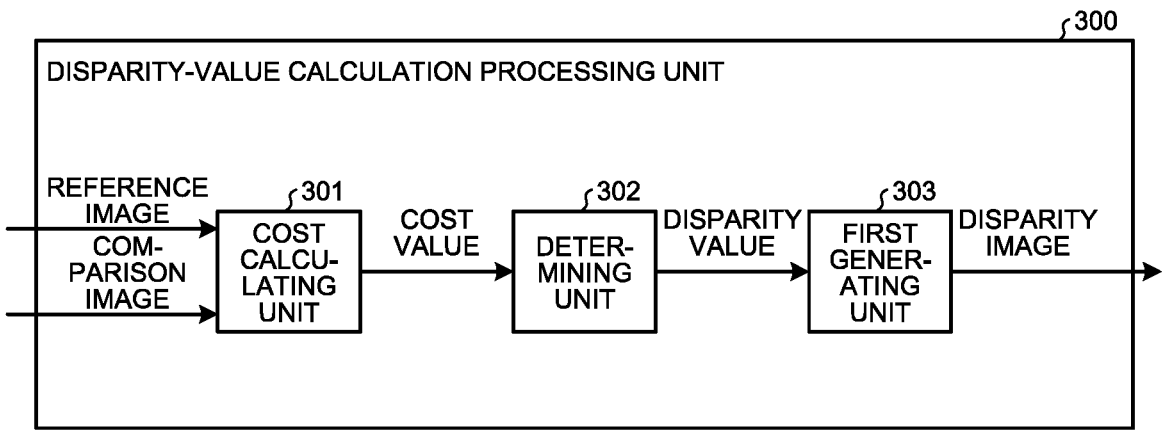
FIG. 5 is a diagram that illustrates an example of the configuration of functional blocks in a disparity-value calculation processing unit of the object recognition apparatus according to the embodiment.
Figure 6:
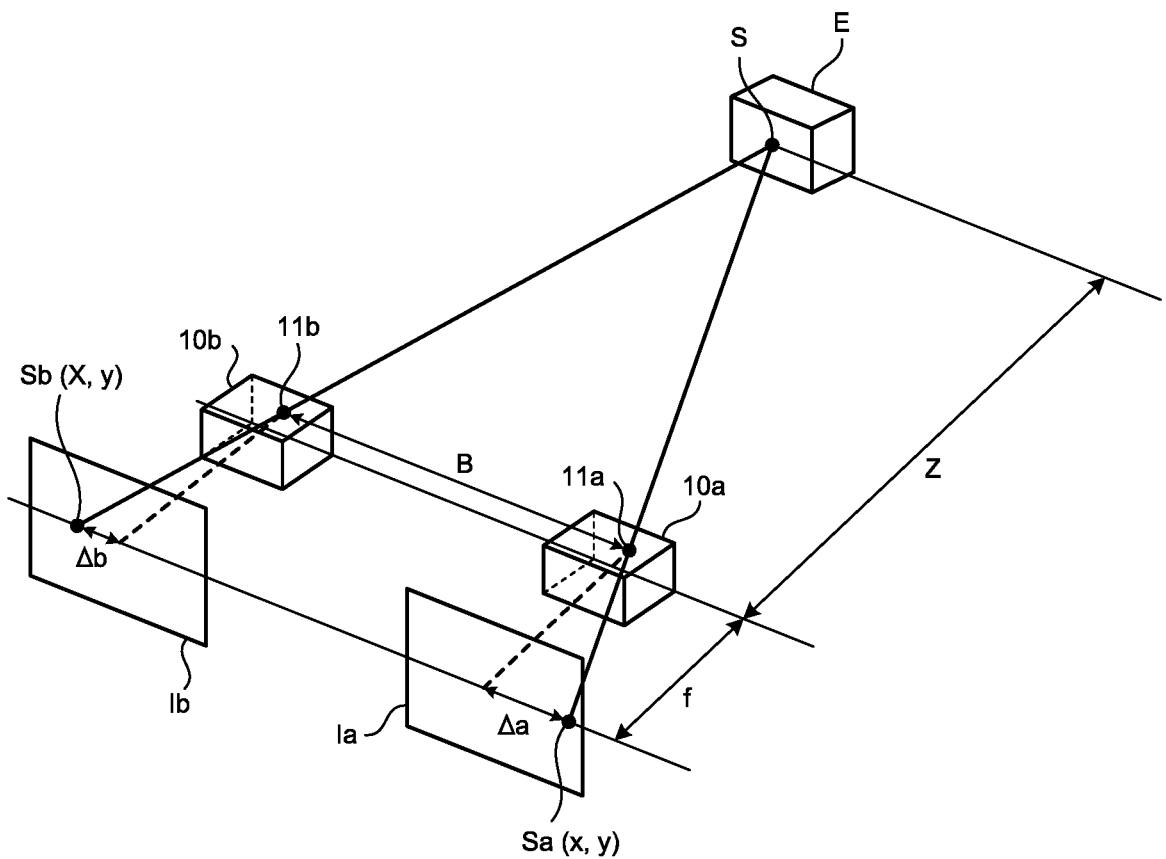
FIG. 6 is a diagram that explains the principle for deriving the distance from an imaging unit to an object.
Figure 7:
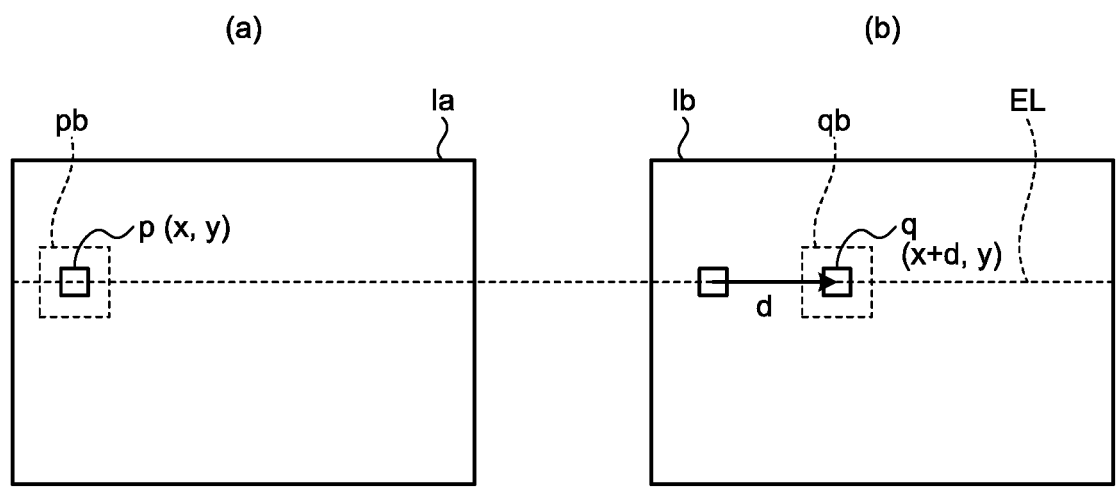
FIG. 7 is a diagram that explains the case of obtaining a corresponding pixel that is in a comparison image and that corresponds to the reference pixel in the reference image.
Figure 8:
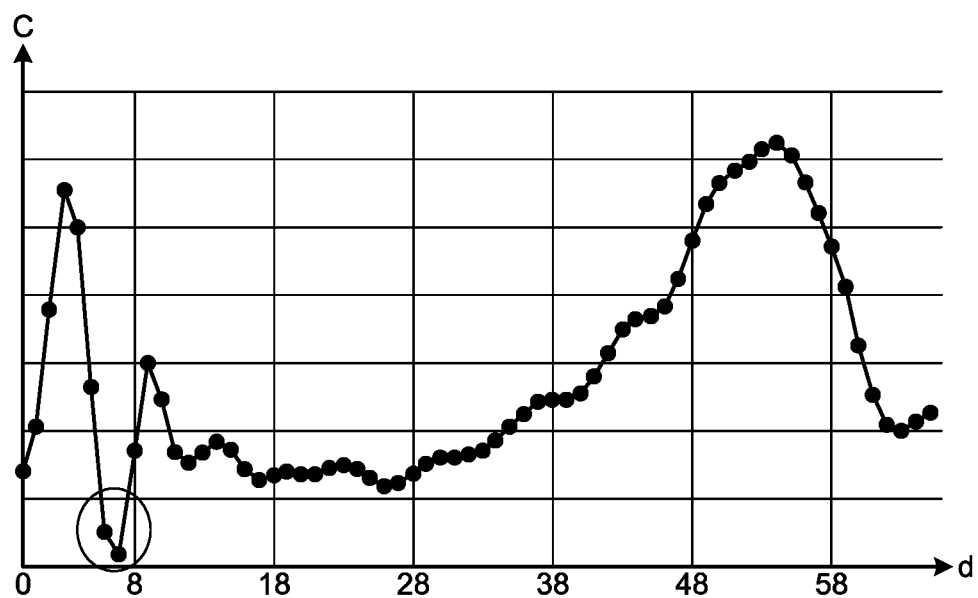
FIG. 8 is a diagram that illustrates an example of the graph of results of block matching processing.

Configuration and Operation of Functional Blocks of the Disparity-Value Calculation Processing Unit FIG. 5 is a diagram that illustrates an example of the configuration of functional blocks in the disparity-value calculation processing unit of the object recognition apparatus according to the embodiment. FIG. 6 is a diagram that explains the principle for deriving the distance from the imaging unit to an object. FIG. 7 is a diagram that explains the case of obtaining a corresponding pixel that is in a comparison image and that corresponds to the reference pixel in the reference image. FIG. 8 is a diagram that illustrates an example of the graph of results of block matching processing.

First, with reference to FIGS. 6 to 8, a distance measuring method using block matching processing is schematically explained.

Principle of Distance Measurement

With reference to FIG. 6, an explanation is given of the principle of deriving the disparity with respect to an object from the stereo camera due to stereo matching processing and measuring the distance from the stereo camera to the object by using the disparity value representing the disparity.

The imaging system illustrated in FIG. 6 includes the imaging unit 10a and the imaging unit 10b that are located parallel at equivalent positions. The imaging units 10a, 10b include the imaging lens 11a, 11b, respectively, which refract incident light to form an image of the object on an image sensor that is a solid state image sensor. Images captured by the imaging unit 10a and the imaging unit 10b are the reference image Ia and the comparison image Ib, respectively. In FIG. 6, on each of the reference image Ia and the comparison image Ib, a point S on an object E in the three-dimensional space is mapped onto a position on a straight line parallel to the straight line connecting the imaging lens 11a and the imaging lens 11b. Here, the point S mapped onto each image is a point Sa(x,y) on the reference image Ia and is a point Sb(X,y) on the comparison image Ib. Here, the disparity value dp is represented as in Equation (1) below by using the point Sa(x,y) on coordinates of the reference image Ia and the point Sb(X,y) on coordinates of the comparison image Ib.

$$dp = X - x \qquad (1)$$

Furthermore, in FIG. 6, the disparity value dp may be represented as $dp = \Delta a + \Delta b$, where $\Delta a$ is the distance between the point Sa(x,y) on the reference image Ia and the intersection point of the perpendicular extending from the imaging lens 11a with the imaging surface and $\Delta b$ is the distance between the point Sb(X,y) on the comparison image Ib and the intersection point of the perpendicular extending from the imaging lens 11b with the imaging surface.

Then, by using the disparity value dp, a distance Z between the imaging units 10a, 10b and the object E is derived. Here, the distance Z is the distance from the straight line connecting the focus position of the imaging lens 11a and the focus position of the imaging lens 11b to the point S on the object E. As illustrated in FIG. 6, the distance Z may be calculated with Equation (2) below by using a focal length f of the imaging lens 11a and the imaging lens 11b, a base length B that is the distance between the imaging lens 11a and the imaging lens 11b, and the disparity value dp.

$$Z=(B\times f)/dp \qquad (2)$$

According to Equation (2), it is understood that the distance Z is shorter as the disparity value dp is larger and the distance Z is longer as the disparity value dp is smaller.

Block Matching Processing

Next, with reference to FIGS. 7 and 8, an explanation is given of a distance measuring method due to block matching processing.

With reference to FIGS. 7 and 8, a method of calculating a cost value C(p,d) is explained. In the following explanation, C(p,d) represents C(x,y,d).

As for FIG. 7, a section (a) is a conceptual diagram that illustrates a reference pixel p and a reference area pb in the reference image Ia, and a section (b) is a conceptual diagram of calculating the cost value C while sequentially shifting (displacing) candidates for the corresponding pixel that is in the comparison image Ib and that corresponds to the reference pixel p illustrated in the section (a) of FIG. 7. Here, the corresponding pixel indicates the pixel that is in the comparison image Ib and that is nearest to the reference pixel p in the reference image Ia. Furthermore, the cost value C is an evaluation value (degree of matching) representing the degree of similarity or the degree of dissimilarity of each pixel in the comparison image Ib with respect to the reference pixel p in the reference image Ia. In explanation, the cost value C described below is an evaluation value representing the degree of dissimilarity indicating that as the value is smaller, the pixel in the comparison image Ib is similar to the reference pixel p.

As illustrated in the section (a) of FIG. 7, on the basis of the luminance value (pixel value) of the reference pixel p(x,y) in the reference image Ia and each of the candidate pixels q(x+d,y) that are candidates for the corresponding pixel on an epipolar line EL in the comparison image Ib with respect to the reference pixel p(x,y), the cost value C(p,d) of the candidate pixel q(x+d,y) that is a candidate for the corresponding pixel with respect to the reference pixel p(x,y) is calculated. The shift amount (displacement amount) between the reference pixel p and the candidate pixel q is d, and the shift amount d is a shift on a pixel to pixel basis. Specifically, while the candidate pixel q(x+d,y) is sequentially shifted by one pixel within a predetermined range (e.g., 0<d<25), the cost value C(p,d) is calculated, which is the degree of dissimilarity between the luminance values of the candidate pixel q(x+d,y) and the reference pixel p(x,y). Furthermore, as the stereo matching processing to obtain the corresponding pixel of the reference pixel p, block matching processing is performed according to the present embodiment. During the block matching processing, the degree of dissimilarity is obtained between the reference area pb that is a predetermined area with the reference pixel p in the reference image Ia as a center and a candidate area qb (the same size as the reference area pb) with the candidate pixel q in the comparison image Ib as a center. SAD (Sum of Absolute Difference), SSD (Sum of Squared Difference), ZSSD (Zero-mean-Sum of Squared Difference), which is obtained by subtracting the average value of blocks from the value of SSD, or the like, is used as the cost value C indicating the degree of dissimilarity between the reference area pb and the candidate area qb. These evaluation values represent the degree of dissimilarity because the value is smaller as the correlation is higher (the degree of similarity is higher).

Furthermore, as described above, the imaging units 10a, 10b are located parallel at equivalent positions and therefore the reference image Ia and the comparison image Ib also have a relation such that they are located parallel at equivalent positions. Therefore, the corresponding pixel that is in the comparison image Ib and that corresponds to the reference pixel p in the reference image Ia is present on the epipolar line EL that is illustrated as a line in a horizontal direction as viewed from the sheet surface in FIG. 7 and, to obtain the corresponding pixel in the comparison image Ib, a pixel is retrieved on the epipolar line EL of the comparison image Ib.

The cost value C(p,d) calculated during the above-described block matching processing is represented by, for example, the graph illustrated in FIG. 8 in relation to the shift amount d. In the example of FIG. 8, as the cost value C is the minimum value when the shift amount d=7, the disparity value dp=7 is derived.

Specific configuration and operation of functional blocks of the disparity-value calculation processing unit With reference to FIG. 5, the specific configuration and operation of functional blocks of the disparity-value calculation processing unit 300 are explained.

As illustrated in FIG. 5, the disparity-value calculation processing unit 300 includes a cost calculating unit 301, a determining unit 302, and a first generating unit 303.

The cost calculating unit 301 is a functional unit that calculates the cost value C(p,d) of each of the candidate pixels q(x+d,y) on the basis of the luminance value of the reference pixel p(x,y) in the reference image Ia and the luminance value of each of the candidate pixels q(x+d,y) that are candidates for the corresponding pixel, identified by shifting the pixel at the corresponding position of the reference pixel p(x,y) by the shift amount d on the epipolar line EL on the comparison image Ib based on the reference pixel p(x,y). Specifically, during block matching processing, the cost calculating unit 301 calculates, as the cost value C, the degree of dissimilarity between the reference area pb that is a predetermined area with the reference pixel p in the reference image Ia as a center and the candidate area qb (the same size as the reference area pb) with the candidate pixel q in the comparison image Ib as a center.

The determining unit 302 is a functional unit that determines that the shift amount d that corresponds to the minimum value of the cost value C calculated by the cost calculating unit 301 is the disparity value dp with respect to a pixel in the reference image Ia that is targeted for calculation of the cost value C.

The first generating unit 303 is a functional unit that generates a disparity image that is an image where, on the basis of the disparity value dp determined by the determining unit 302, the pixel value of each pixel of the reference image Ia is replaced with the disparity value dp that corresponds to the pixel.

Each of the cost calculating unit 301, the determining unit 302, and the first generating unit 303 illustrated in FIG. 5 is implemented by using the FPGA 31 illustrated in FIG. 3. Furthermore, all or part of the cost calculating unit 301, the determining unit 302, and the first generating unit 303 may be implemented when the CPU 32 executes programs stored in the ROM 33 instead of the FPGA 31 that is a hardware circuit.

Here, the functions of the cost calculating unit 301, the determining unit 302, and the first generating unit 303 in the disparity-value calculation processing unit 300 illustrated in FIG. 5 are illustrated as a concept, and this configuration is not a limitation. For example, multiple functional units that are illustrated as separate functional units in the disparity-value calculation processing unit 300 illustrated in FIG. 5 may be configured as a single functional unit. Conversely, a function provided in a single functional unit in the disparity-value calculation processing unit 300 illustrated in FIG. 5 may be divided and configured as multiple functional units.

Figure 9:
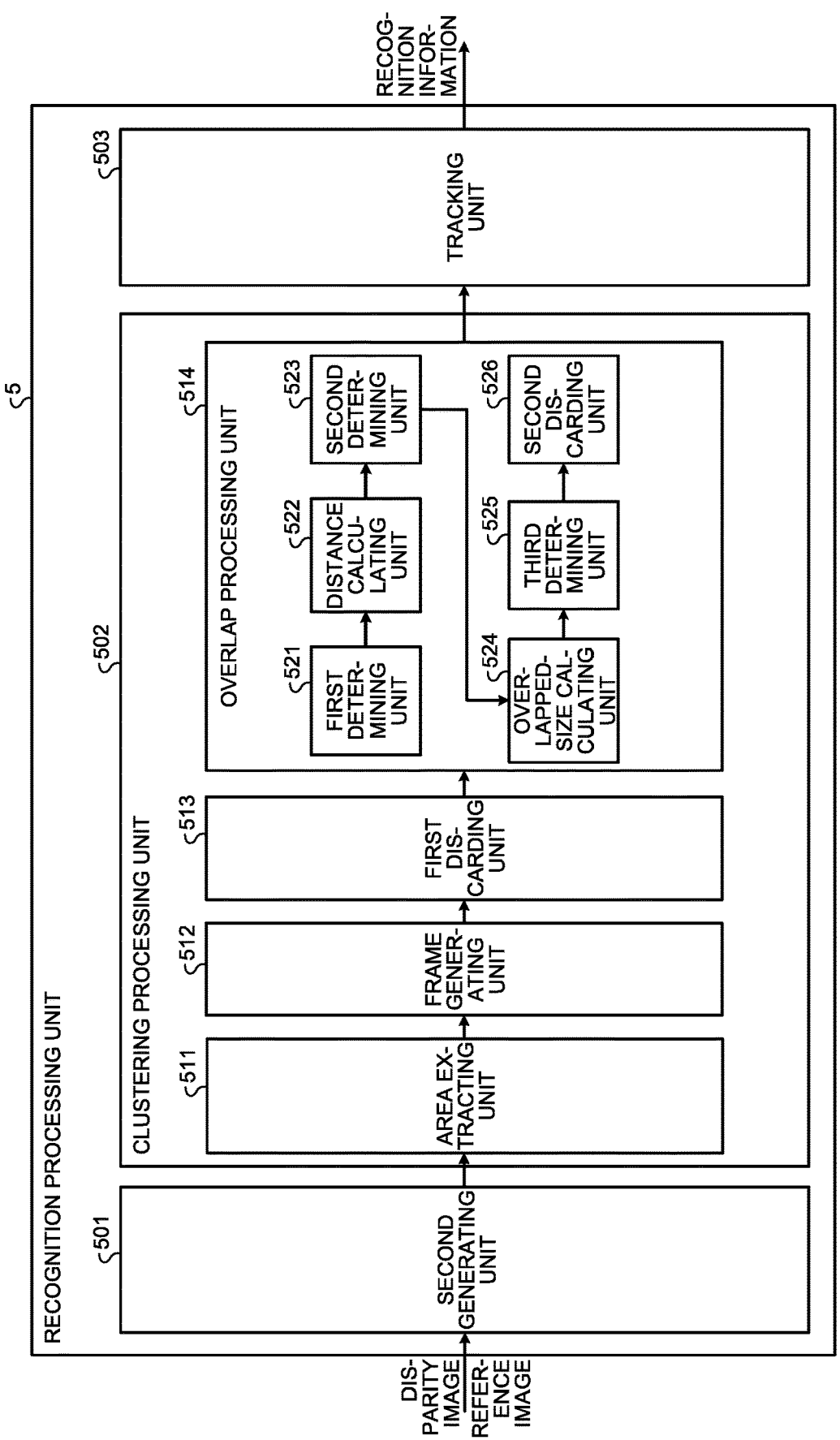
FIG. 9 is a diagram that illustrates an example of the configuration of functional blocks of the recognition processing unit in the object recognition apparatus according to the embodiment.
Figure 10:
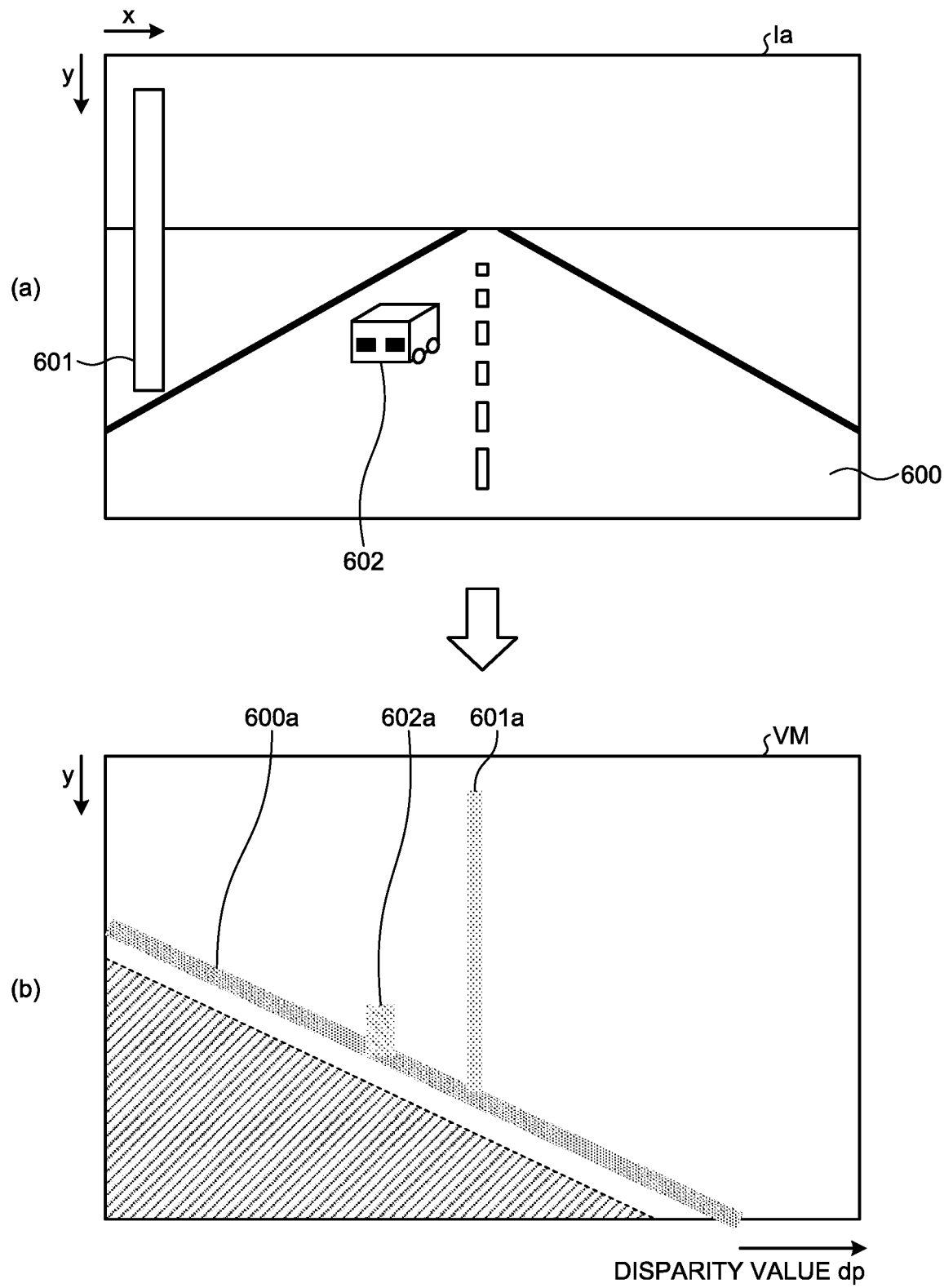
FIG. 10 is a diagram that illustrates an example of the V map generated from a disparity image.
Figure 11:
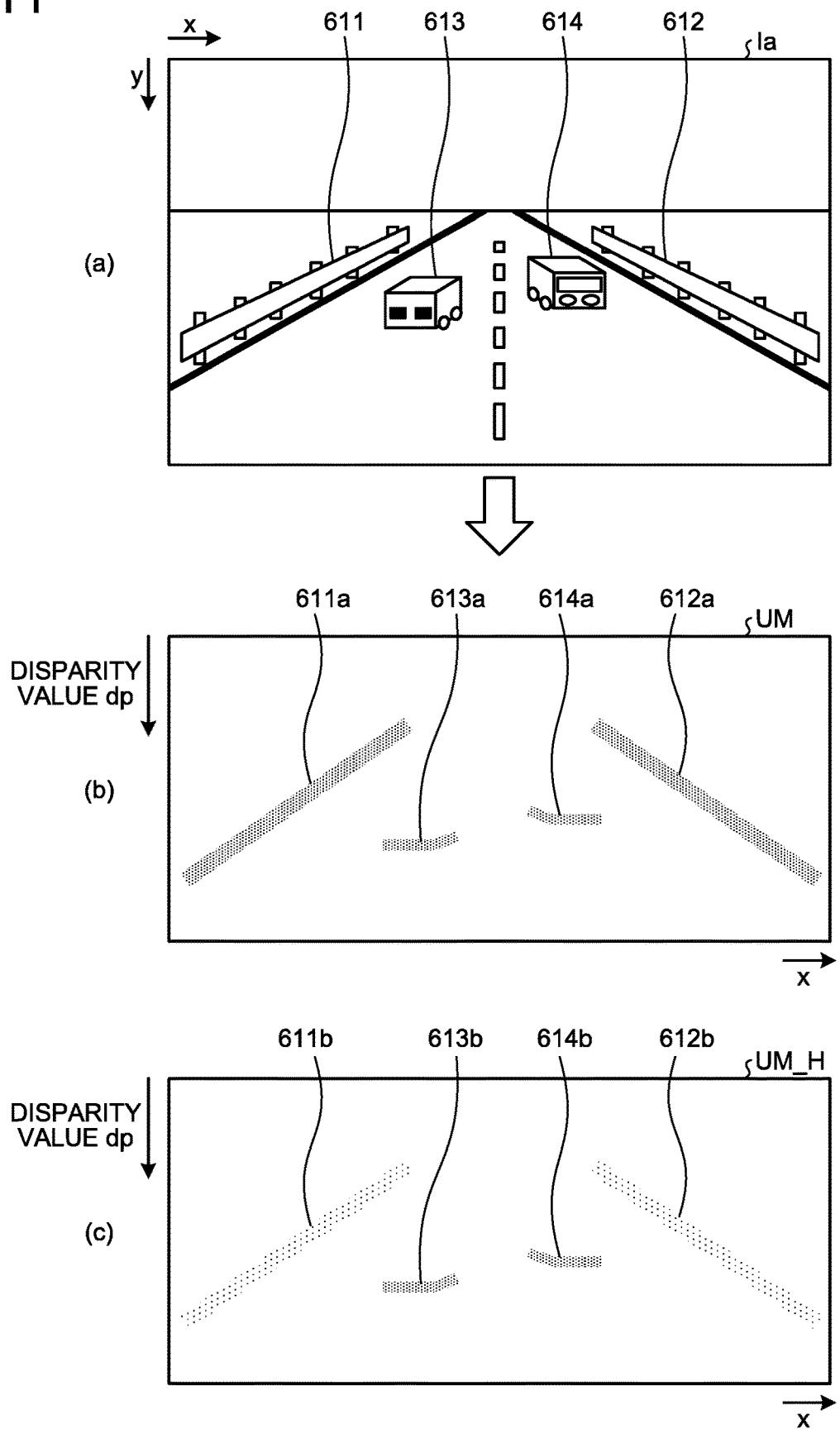
FIG. 11 is a diagram that illustrates an example of the U map generated from a disparity image.
Figure 12:
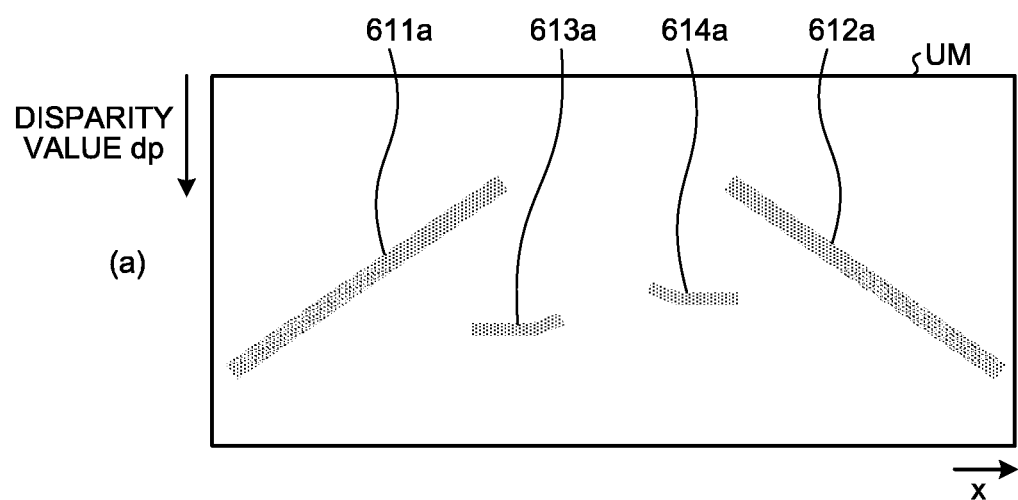
FIG. 12 is a diagram that illustrates an example of the real U map generated from a U map.
Figure 12:
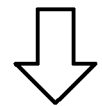
Figure 12:
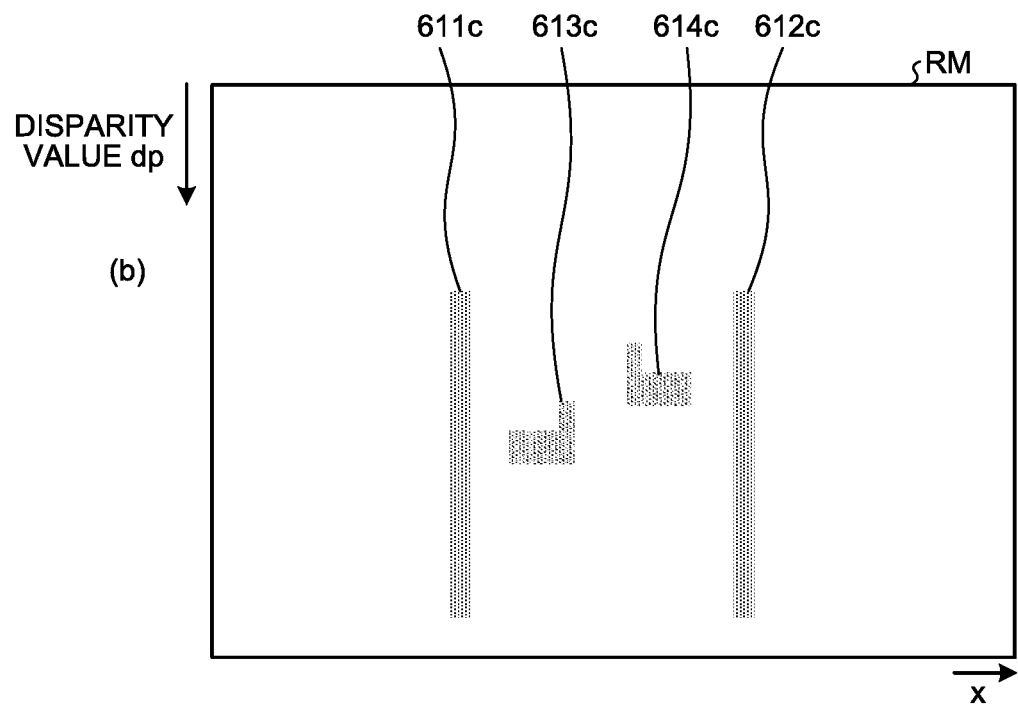
Figure 13:
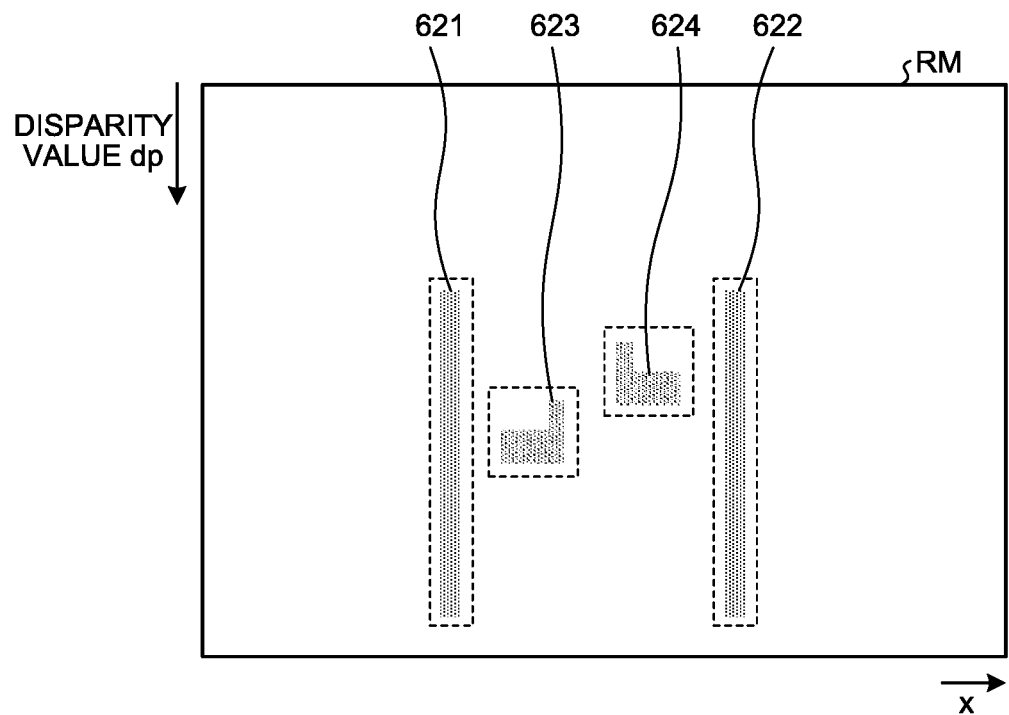
FIG. 13 is a diagram that illustrates a process to extract an isolated area from a real U map.
Figure 14:
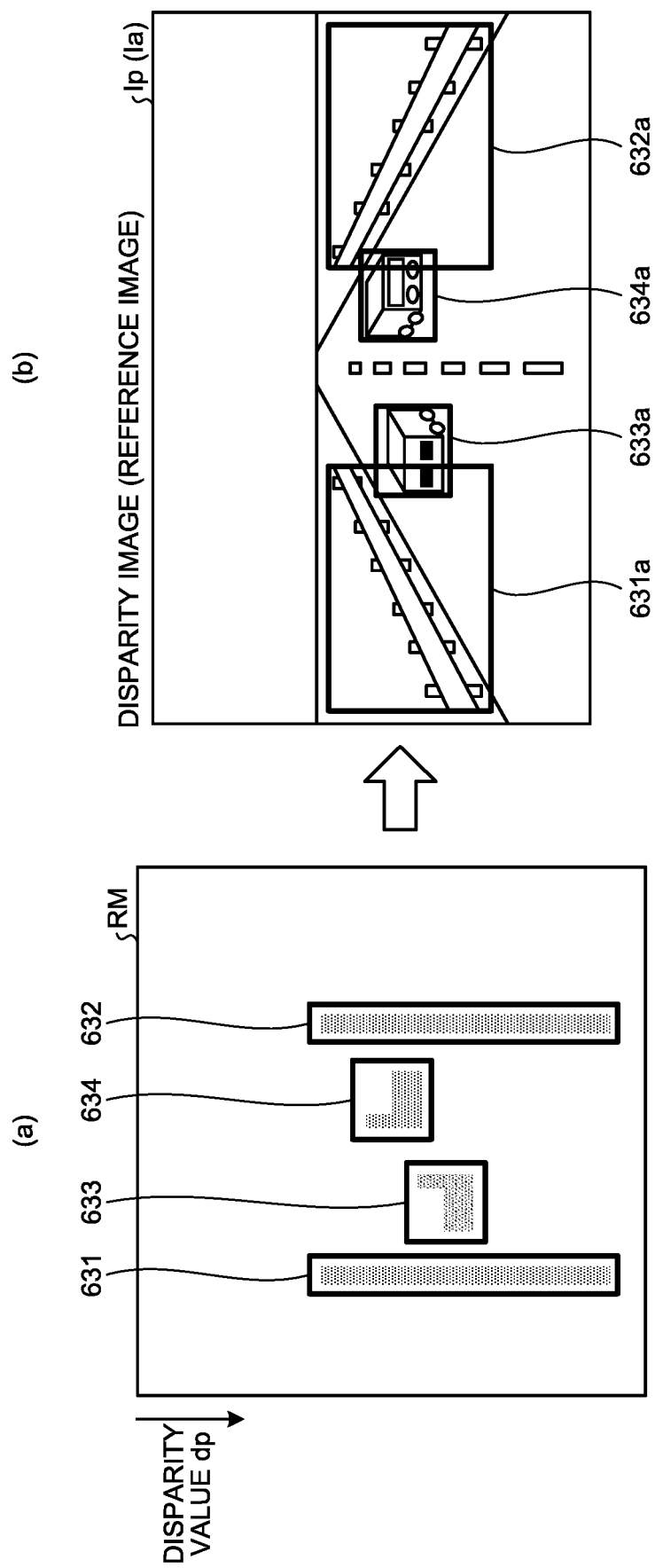
FIG. 14 is a diagram that illustrates a process to generate a detection frame.
Figure 15:
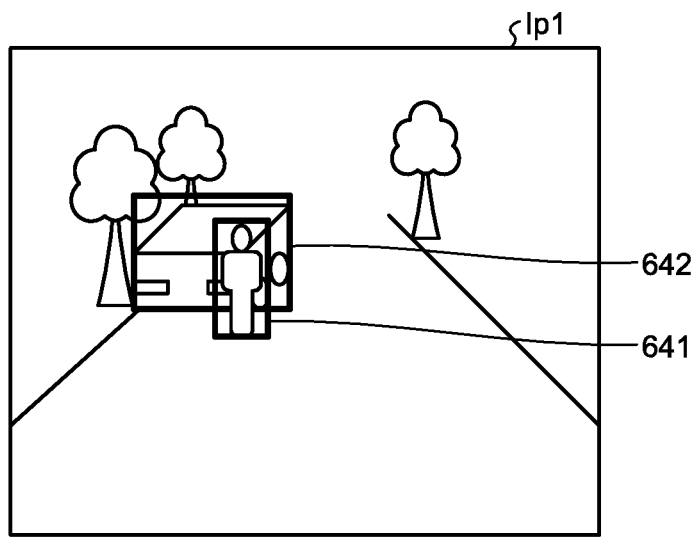
FIG. 15 is a diagram that illustrates a case where the distance between frames is short.
Figure 16:
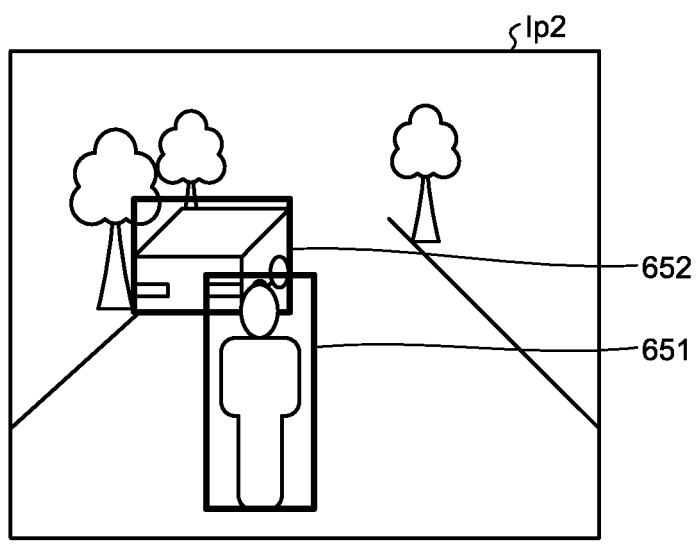
FIG. 16 is a diagram that illustrates a case where the distance between frames is long.

Configuration and Operation of Functional Blocks in the Recognition Processing Unit FIG. 9 is a diagram that illustrates an example of the configuration of functional blocks of the recognition processing unit in the object recognition apparatus according to the embodiment. FIG. 10 is a diagram that illustrates an example of the V map generated from a disparity image. FIG. 11 is a diagram that illustrates an example of the U map generated from a disparity image. FIG. 12 is a diagram that illustrates an example of the real U map generated from a U map. FIG. 13 is a diagram that illustrates a process to extract an isolated area from a real U map. FIG. 14 is a diagram that illustrates a process to generate a detection frame. FIG. 15 is a diagram that illustrates a case where the distance between frames is short. FIG. 16 is a diagram that illustrates a case where the distance between frames is long. With reference to FIGS. 9 to 16, the configuration and operation of functional blocks of the recognition processing unit 5 are explained.

As illustrated in FIG. 9, the recognition processing unit 5 includes a second generating unit 501, a clustering processing unit 502, and a tracking unit 503.

The second generating unit 501 is a functional unit that receives a disparity image from the disparity-value calculation processing unit 300, receives the reference image Ia from the disparity-value deriving unit 3, and generates a V-Disparity map, U-Disparity map, and Real U-Disparity map, or the like. Specifically, to detect a road surface from the disparity image input from the disparity-value calculation processing unit 300, the second generating unit 501 generates a V map VM that is the V-Disparity map illustrated in a section (b) of FIG. 10. Here, the V-Disparity map is a two-dimensional histogram indicating the frequency distribution of the disparity value dp, where the vertical axis is the y axis of the reference image Ia and the horizontal axis is the disparity value dp (or distance) of the disparity image. For example, a road surface 600, a power pole 601, and a vehicle 602 appear in the reference image Ia illustrated in a section (a) of FIG. 10. On the V map VM, the road surface 600 in the reference image Ia corresponds to a road surface portion 600a, the power pole 601 corresponds to a power pole portion 601a, and the vehicle 602 corresponds to a vehicle portion 602a.

Furthermore, the second generating unit 501 conducts linear approximation on the position that is estimated to be a road surface based on the generated V map VM. When a road surface is flat, approximation is possible by using a single straight line; however, when the gradient of the road surface changes, there is a need to divide the V map VM into sections and conduct linear approximation with high accuracy. Known technologies such as Hough transform or the least-square method may be used as linear approximation. On the V map VM, the power pole portion 601a and the vehicle portion 602a, which are clusters located above the detected road surface portion 600a, are equivalent to the power pole 601 and the vehicle 602, respectively, that are objects on the road surface 600. When a U-Disparity map is generated by the second generating unit 501 described later, only information above the road surface is used to remove noise.

Furthermore, the second generating unit 501 generates a U map UM that is a U-Disparity map illustrated in a section (b) of FIG. 11 to recognize objects by using only information located above the road surface detected from the V map VM, i.e., by using information that is in a disparity image and that is equivalent to a left guardrail 611, a right guardrail 612, a vehicle 613, and a vehicle 614 in the reference image Ia illustrated in a section (a) of FIG. 11. Here, the U map UM is a two-dimensional histogram indicating the frequency distribution of the disparity value dp, where the horizontal axis is the x axis of the reference image Ia and the vertical axis is the disparity value dp (or distance) of the disparity image. The left guardrail 611 in the reference image Ia illustrated in FIG. the section (a) of 11 is equivalent to a left guardrail portion 611a on the U map UM, the right guardrail 612 is equivalent to a right guardrail portion 612a, the vehicle 613 is equivalent to a vehicle portion 613a, and the vehicle 614 is equivalent to a vehicle portion 614a.

Furthermore, the second generating unit 501 generates a U map UM_H that is an example of the U-Disparity map illustrated in a section (c) of FIG. 11 by using only information located above the road surface detected from the V map VM, i.e., by using information that is in a disparity image and that is equivalent to the left guardrail 611, the right guardrail 612, the vehicle 613, and the vehicle 614 in the reference image Ia illustrated in the section (a) of FIG. 11. Here, the U map UM_H, which is an example of the U-Disparity map, is an image where the horizontal axis is the x axis of the reference image Ia, the vertical axis is the disparity value dp of the disparity image, and the pixel value is the height of an object. The left guardrail 611 in the reference image Ia illustrated in the section (a) of FIG. 11 is equivalent to a left guardrail portion 611b on the U map UM_H, the right guardrail 612 is equivalent to a right guardrail portion 612b, the vehicle 613 is equivalent to a vehicle portion 613b, and the vehicle 614 is equivalent to a vehicle portion 614b.

Furthermore, from the generated U map UM illustrated in a section (a) of FIG. 12, the second generating unit 501 generates a real U map RM that is a Real U-Disparity map illustrated in a section (b) of FIG. 12 in which the horizontal axis has been converted into the actual distance. Here, the real U map RM is a two-dimensional histogram in which the horizontal axis is the actual distance in a direction from the imaging unit 10b (the left camera) to the imaging unit 10a (the right camera) and the vertical axis is the disparity value dp of the disparity image (or the distance in a depth direction that is converted from the disparity value dp). The left guardrail portion 611a on the U map UM illustrated in the section (a) of FIG. 12 is equivalent to a left guardrail portion 611c on the real U map RM, the right guardrail portion 612a is equivalent to a right guardrail portion 612c, the vehicle portion 613a is equivalent to a vehicle portion 613c, and the vehicle portion 614a is equivalent to a vehicle portion 614c. Specifically, on the U map UM, the second generating unit 501 does not decimate pixels in the case of a long distance (the small disparity value dp) as an object is small and therefore there is a small amount of disparity information and a distance resolution is low but decimates a large number of pixels in the case of a short distance as an object appears to be large and therefore there is a large amount of disparity information and a distance resolution is high, thereby generating the real U map RM that is equivalent to a plane view. As described later, the cluster of pixel values (object) ("isolated area" described later) is extracted from the real U map RM so that the object can be detected. In this case, the width of the rectangle enclosing a cluster corresponds to the width of an extracted object, and its height corresponds to the depth of the extracted object. Furthermore, the second generating unit 501 is capable of not only generating the real U map RM from the U map UM but also generating the real U map RM directly from the disparity image.

Furthermore, images input from the disparity-value deriving unit 3 to the second generating unit 501 are not limited to the reference image Ia, but the comparison image Ib may be the target.

The second generating unit 501 is implemented by using the FPGA 51 illustrated in FIG. 3. Furthermore, the second generating unit 501 may be implemented when the CPU 52 executes programs stored in the ROM 53 instead of the FPGA 51 that is a hardware circuit.

The clustering processing unit 502 is a functional unit that performs clustering processing to detect an object appearing in a disparity image on the basis of each map output from the second generating unit 501. As illustrated in FIG. 9, the clustering processing unit 502 includes an area extracting unit 511 (extracting unit), a frame generating unit 512 (determining unit), a first discarding unit 513, and an overlap processing unit 514.

The area extracting unit 511 is a functional unit that extracts an isolated area that is a cluster of pixel values from the real U map RM included in maps (images) output from the second generating unit 501. Specifically, the area extracting unit 511 conducts binarization processing, labeling processing, or the like, on the real U map RM and extracts an isolated area with respect to each piece of identification information on the labeling processing. For example, FIG. 13 illustrates a state where isolated areas are extracted from the real U map RM. In the example of the real U map RM illustrated in the case of FIG. 13, the area extracting unit 511 extracts isolated areas 621 to 624 as isolated areas. The isolated areas extracted by the area extracting unit 511 correspond to objects appearing in the reference image Ia, and they represent recognized areas of the objects in the reference image Ia.

Furthermore, based on the U map UM or the real U map RM generated by the second generating unit 501, the area extracting unit 511 is capable of identifying the position and the width (xmin, xmax) of the object at an isolated area in the x-axis direction on the disparity image and the reference image Ia. Furthermore, the area extracting unit 511 is capable of identifying the actual depth of an object based on information (dmin, dmax) on the height of the object on the U map UM or the real U map RM. Furthermore, based on the V map VM generated by the second generating unit 501, the area extracting unit 511 is capable of identifying the position and the height (ymin="the y-coordinate that is equivalent to the maximum height from the road surface with the maximum disparity value", ymax="the y-coordinate indicating the height of the road surface obtained from the maximum disparity value") of an object in the y-axis direction on the disparity image and the reference image Ia. Furthermore, the area extracting unit 511 is capable of identifying the actual size of an object in the x-axis direction and the y-axis direction based on the width (xmin, xmax) of the object in the x-axis direction, the height (ymin, ymax) in the y-axis direction, and the disparity value dp that corresponds to each of them, identified on the disparity image. As described above, by using the V map VM, the U map UM, and the real U map RM, the area extracting unit 511 is capable of identifying the position and the actual width, height, and depth of the object at an isolated area in the reference image Ia. Furthermore, as the area extracting unit 511 identifies the position of an object in the reference image Ia, the position in a disparity image is determined, and the distance to the object is also determined.

With regard to each extracted isolated area, the area extracting unit 511 generates recognized-area information that is information about an isolated area and includes, in the recognized-area information, here for example identification information on a labeling process and information on the position and the size of an isolated area on the reference image Ia, the V map VM, the U map UM, and the real U map RM. The area extracting unit 511 sends the generated recognized-area information to the frame generating unit 512.

Furthermore, on an extracted isolated area, the area extracting unit 511 may perform processing such as smoothing to reduce noise, disparity dispersion, and the like, which are present on the real U map RM, plane detection of the object at an isolated area, or deletion of unnecessary areas.

The frame generating unit 512 is a functional unit that, with respect to the isolated area of an object on the real U map RM extracted by the area extracting unit 511, generates a frame at the object's area (hereafter, sometimes referred to as detection area) that is in a disparity image Ip (or the reference image Ia) and that corresponds to the isolated area. Specifically, the frame generating unit 512 generates detection frames 631a to 634a in the disparity image Ip or the reference image Ia as illustrated in a section (b) of FIG. 14 such that they correspond to detection areas 631 to 634 that correspond to the isolated areas 621 to 624, respectively, which are extracted by the area extracting unit 511 from the real U map RM, as illustrated in a section (a) of FIG. 14. The frame generating unit 512 includes the information on the frame generated on the disparity image Ip or the reference image Ia in the recognized-area information and sends it to the first discarding unit 513.

The first discarding unit 513 is a functional unit that determines what the object is on the basis of the actual size (width, height, depth) of the object (hereafter, sometimes referred to as detection object) in a detection area indicated with a frame by the frame generating unit 512 based on the size of the detection area and that discards it in accordance with the type of object. The first discarding unit 513 uses for example the following (Table 1) to determine what a detection object is. For example, when the width of the object is 1300 [mm], the height is 1800 [mm], and the depth is 2000 [mm], it is determined that the object is a "standard-sized automobile". Here, the information that relates width, height, and depth with type of object (object type) may be stored as a table like (Table 1) in the RAM 54, or the like. Here, the relation between a size and a type of object (object type) illustrated in (Table 1) is an example, and they may be defined as a relation between a different size and a type of object.

TABLE 1

| Object type | Width | Height | Unit (mm) Depth |
|---|---|---|---|
| Motorbike, bicycle | <1100 | <2500 | >1000 |
| Pedestrian | <1100 | <2500 | <=1000 |
| Small-sized automobile | <1700 | <1700 | <10000 |
| Standard-sized automobile | <1700 | <2500 | <10000 |
| Truck | <3500 | <3500 | <15000 |
| Others | Not applied to above sizes | | |

The first discarding unit 513 discards an object that is determined not to be targeted for subsequent processing (overlap processing, tracking processing, or the like, described later) in accordance with the determined type of detection object. For example, when pedestrians (persons) and vehicles are targeted for subsequent processing, the first discarding unit 513 discards detection objects indicated by detection frames 631a, 632a illustrated in the section (b) of FIG. 14 as they are side wall objects (guardrails). To discard a detection object, for example, the first discarding unit 513 includes a flag (discard flag) indicating discard in the recognized-area information on the detection object. Here, the first discarding unit 513 determines whether a detection object is to be discarded in accordance with the determined type of detection object; however, this is not a limitation, and it may be determined whether an object in a detection area is to be discarded in accordance with the size of the detection area. The first discarding unit 513 includes a discard flag indicating whether the detection object is to be discarded in the recognized-area information and sends it to the overlap processing unit 514. Furthermore, with regard to a detection object in the following explanation of an overlap process and a tracking process, it is assumed that the discard flag included in the recognized-area information is off, that is, it is not discarded.

The overlap processing unit 514 is a functional unit that, when detection areas are overlapped, performs an overlap process to determine whether objects in the detection areas are to be discarded on the basis of the size of the overlapped detection areas. The overlap processing unit 514 includes a first determining unit 521, a distance calculating unit 522 (first calculating unit), a second determining unit 523 (determining unit), an overlapped-size calculating unit 524 (second calculating unit), a third determining unit 525, and a second discarding unit 526 (discarding unit).

The first determining unit 521 is a functional unit that determines whether two detection areas are overlapped.

The distance calculating unit 522 is a functional unit that, when the first determining unit 521 determines that detection areas are overlapped, calculates the distance (hereafter, sometimes referred to as the distance between frames) between objects in the overlapped detection areas in a depth direction.

The second determining unit 523 is a functional unit that determines whether the distance between frames calculated by the distance calculating unit 522 is less than a predetermined threshold. In the following explanation, a distance equal to or longer than the predetermined threshold is referred to as "long distance" (second distance range), and a distance less than the predetermined threshold is "short distance" (first distance range). Here, the second determining unit 523 switches the predetermined threshold to be compared with the distance between frames in accordance with the distance to a closer object between two detection objects, for example, as illustrated in the following (Table 2). For example, as illustrated in (Table 2), when the distance to a closer object between two detection objects is equal to and more than 15 [m] and less than 35 [m], the second determining unit 523 sets 4.5 [m] as the predetermined threshold to be compared with the distance between frames. Here, the relation between the distance to a detection object and the threshold to be compared with the distance between frames illustrated in (Table 2) is an example, and they may be defined with a different relation. The details of a determination process by the second determining unit 523 are described later with reference to FIG. 19.

TABLE 2

| Threshold item | Threshold |
|---|---|
| Distance between frames (distance to detection object is less than 15[m]) | 2.5 [m] |
| Distance between frames (distance to detection object is equal to or more than 15[m] and less than 35[m]) | 4.5 [m] |
| Distance between frames (distance to detection object is more than 35[m]) | 9 [m] |

Here, FIG. 15 illustrates an example of the case where the distance between frames is a short distance. A disparity image Ip1 illustrated in FIG. 15 indicates that a detection area 641 in which the detection object is a pedestrian and a detection area 642 in which the detection object is a vehicle is in a short distance and parts of the detection areas 641, 642 are overlapped. Conversely, FIG. 16 illustrates an example of the case where the distance between frames is a long distance. A disparity image Ip2 illustrated in FIG. 16 indicates that a detection area 651 in which the detection object is a pedestrian and a detection area 652 in which the detection object is a vehicle are in a long distance and parts of the detection areas 651, 652 are overlapped.

The overlapped-size calculating unit 524 is a functional unit that calculates the size (hereafter, sometimes referred to as overlap size) of the area where two detection areas are overlapped. The process to calculate the overlap size by the overlapped-size calculating unit 524 is explained later in detail with reference to FIGS. 19, 20, 22, and 23.

The third determining unit 525 is a functional unit that determines whether the overlap size calculated by the overlapped-size calculating unit 524 is more than a predetermined percentage of the size of any one of the two detection areas (a threshold with regard to the overlap percentage of a detection area). Here, the third determining unit 525 switches the predetermined percentage (threshold) depending on whether the distance between frames in two detection areas is a short distance or a long distance, as illustrated in for example the following (Table 3). For example, as illustrated in (Table 3), when the distance between frames in two detection areas is a long distance, the third determining unit 525 uses 15[%] of the size of any one of the two detection areas as the threshold with regard to the overlap percentage of the detection areas. Here, the relation between the distance between frames and the threshold with regard to the overlap percentage of detection areas illustrated in (Table 3) is an example, and they may be defined with a different relation. A determination process by the third determining unit 525 is described later in detail with reference to FIG. 19.

TABLE 3

| Threshold item | Threshold |
|---|---|
| Overlap percentage of detection areas (when distance between frames is short) | 35 [%] of any one |
| Overlap percentage of detection areas (when distance between frames is long) | 15 [%] of any one |

The second discarding unit 526 is a functional unit that determines whether objects in two detection areas are to be discarded in accordance with a determination result regarding the overlap size by the third determining unit 525. The second discarding unit 526 includes the discard flag indicating whether the detection object is discarded in the recognized-area information and sends it to the tracking unit 503. The discard process by the second discarding unit 526 is described later in detail with reference to FIG. 19.

The area extracting unit 511, the frame generating unit 512, and the first discarding unit 513 of the clustering processing unit 502 and the first determining unit 521, the distance calculating unit 522, the second determining unit 523, the overlapped-size calculating unit 524, the third determining unit 525, and the second discarding unit 526 of the overlap processing unit 514, illustrated in FIG. 9, are implemented by using the FPGA 51 illustrated in FIG. 3. Furthermore, all or part of the area extracting unit 511, the frame generating unit 512, and the first discarding unit 513 of the clustering processing unit 502 and the first determining unit 521, the distance calculating unit 522, the second determining unit 523, the overlapped-size calculating unit 524, the third determining unit 525, and the second discarding unit 526 of the overlap processing unit 514 may be implemented when the CPU 52 executes programs stored in the ROM 53 instead of the FPGA 51 that is a hardware circuit.

The tracking unit 503 is a functional unit that performs a tracking process on a detection object whose discard flag is off on the basis of the recognized-area information that is information related to the object detected by the clustering processing unit 502. The tracking unit 503 outputs the recognized-area information including a result of a tracking process as recognition information to the vehicle control device 6 (see FIG. 3). The tracking unit 503 is implemented by using the FPGA 51 illustrated in FIG. 3. Furthermore, the tracking unit 503 may be implemented when the CPU 52 executes programs stored in the ROM 53 instead of the FPGA 51 that is a hardware circuit.

Furthermore, "the image processing apparatus" according to the present invention may be the clustering processing unit 502 or the recognition processing unit 5 including the clustering processing unit 502.

Furthermore, the function of each functional unit of the recognition processing unit 5 illustrated in FIG. 9 is illustrated as a concept, and this configuration is not a limitation. For example, multiple functional units that are illustrated as separate functional units in the recognition processing unit 5 illustrated in FIG. 9 may be configured as a single functional unit. Conversely, a function provided in a single functional unit in the recognition processing unit 5 illustrated in FIG. 9 may be divided and configured as multiple functional units.

Operation of the Object Recognition Apparatus

Next, with reference to FIGS. 17 to 24, an explanation is given of a specific operation of the object recognition apparatus 1.

Block Matching Processing of the Disparity-Value Deriving Unit

Figure 17:
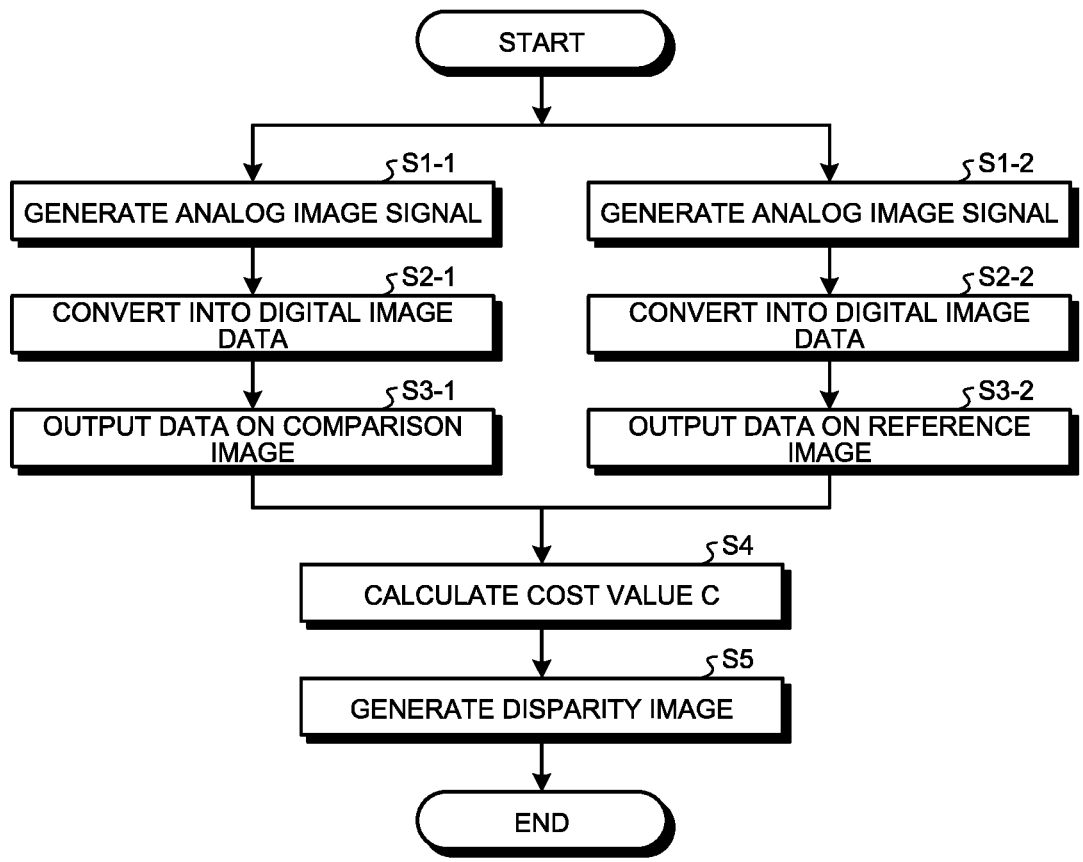
FIG. 17 is a flowchart that illustrates an example of operation during block matching processing by a disparity-value deriving unit according to the embodiment.

FIG. 17 is a flowchart that illustrates an example of operation during block matching processing by the disparity-value deriving unit according to the embodiment. With reference to FIG. 17, an explanation is given of the flow of operation during the block matching processing by the disparity-value deriving unit 3 in the object recognition apparatus 1.

Step S1-1

The image acquiring unit 100b in the disparity-value deriving unit 3 captures an image of the object in the front by using the left camera (the imaging unit 10b), generates analog image signals, and obtains a luminance image that is an image based on the image signals. Thus, image signals targeted for the subsequent image processing are obtained. Then, a transition is made to Step S2-1.

Step S1-2

The image acquiring unit 100a in the disparity-value deriving unit 3 captures an image of the object in the front by using the right camera (the imaging unit 10a), generates analog image signals, and obtains a luminance image that is an image based on the image signals. Thus, image signals targeted for the subsequent image processing are obtained. Then, a transition is made to Step S2-2.

Step S2-1

The converting unit 200b in the disparity-value deriving unit 3 removes noise from the analog image signals obtained during capturing by the imaging unit 10b and converts it into digital-format image data. Due to this conversion into digital-format image data, image processing is possible on the image based on the image data on a pixel by pixel basis. Then, a transition is made to Step S3-1.

Step S2-2

The converting unit 200a in the disparity-value deriving unit 3 removes noise from the analog image signals obtained during capturing by the imaging unit 10a and converts it into digital-format image data. Due to this conversion into digital-format image data, image processing is possible on the image based on the image data on a pixel by pixel basis. Then, a transition is made to Step S3-2.

Step S3-1

The converting unit 200b outputs the image based on the digital-format image data, converted at Step S2-1, as the comparison image Ib for block matching processing. Thus, the target image to be compared so as to obtain a disparity value during block matching processing is obtained. Then, a transition is made to Step S4.

Step S3-2

The converting unit 200a outputs the image based on the digital-format image data, converted at Step S2-2, as the reference image Ia for block matching processing. Thus, the reference image to obtain a disparity value during block matching processing is obtained. Then, a transition is made to Step S4.

Step S4

The cost calculating unit 301 of the disparity-value calculation processing unit 300 in the disparity-value deriving unit 3 calculates and acquires the cost value C(p,d) of each of the candidate pixels q(x+d,y) for the corresponding pixel on the basis of the luminance value of the reference pixel p(x,y) in the reference image Ia and the luminance value of each of the candidate pixels q(x+d,y) that are identified by shifting them from the pixel at the corresponding position of the reference pixel p(x,y) by the shift amount d on the epipolar line EL in the comparison image Ib based on the reference pixel p(x,y). Specifically, during block matching processing, the cost calculating unit 301 calculates, as the cost value C, the degree of dissimilarity between the reference area pb that is a predetermined area with the reference pixel p in the reference image Ia as a center and the candidate area qb (the same size as the reference area pb) with the candidate pixel q in the comparison image Ib as a center. Then, a transition is made to Step S5.

Step S5

The determining unit 302 of the disparity-value calculation processing unit 300 in the disparity-value deriving unit 3 determines that the shift amount d that corresponds to the minimum value of the cost value C calculated by the cost calculating unit 301 is the disparity value dp with respect to a pixel in the reference image Ia targeted for calculation of the cost value C. Then, the first generating unit 303 of the disparity-value calculation processing unit 300 in the disparity-value deriving unit 3 generates a disparity image that is an image representing the luminance value of each pixel of the reference image Ia with the disparity value dp that corresponds to the pixel on the basis of the disparity value dp determined by the determining unit 302. The first generating unit 303 outputs the generated disparity image to the recognition processing unit 5.

Although block matching processing is explained above as an example of stereo matching processing, this is not a limitation, and SGM (Semi-Global Matching) technique may be used for processing.

Object Recognition Process of the Recognition Processing Unit

Figure 18:
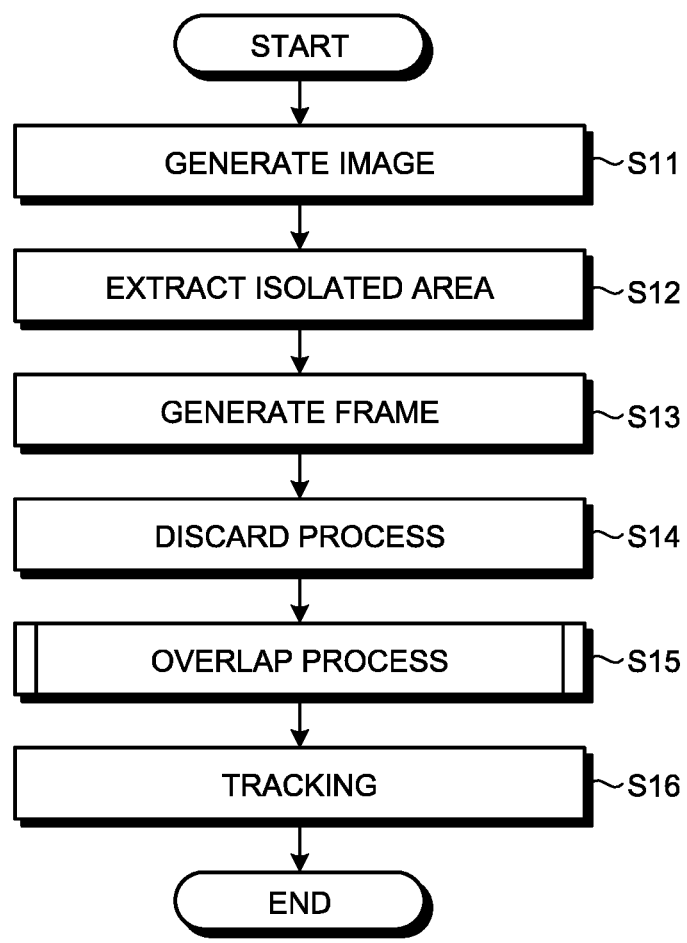
FIG. 18 is a flowchart that illustrates an example of operation during the object recognition process by a recognition processing unit according to the embodiment.
Figure 19:
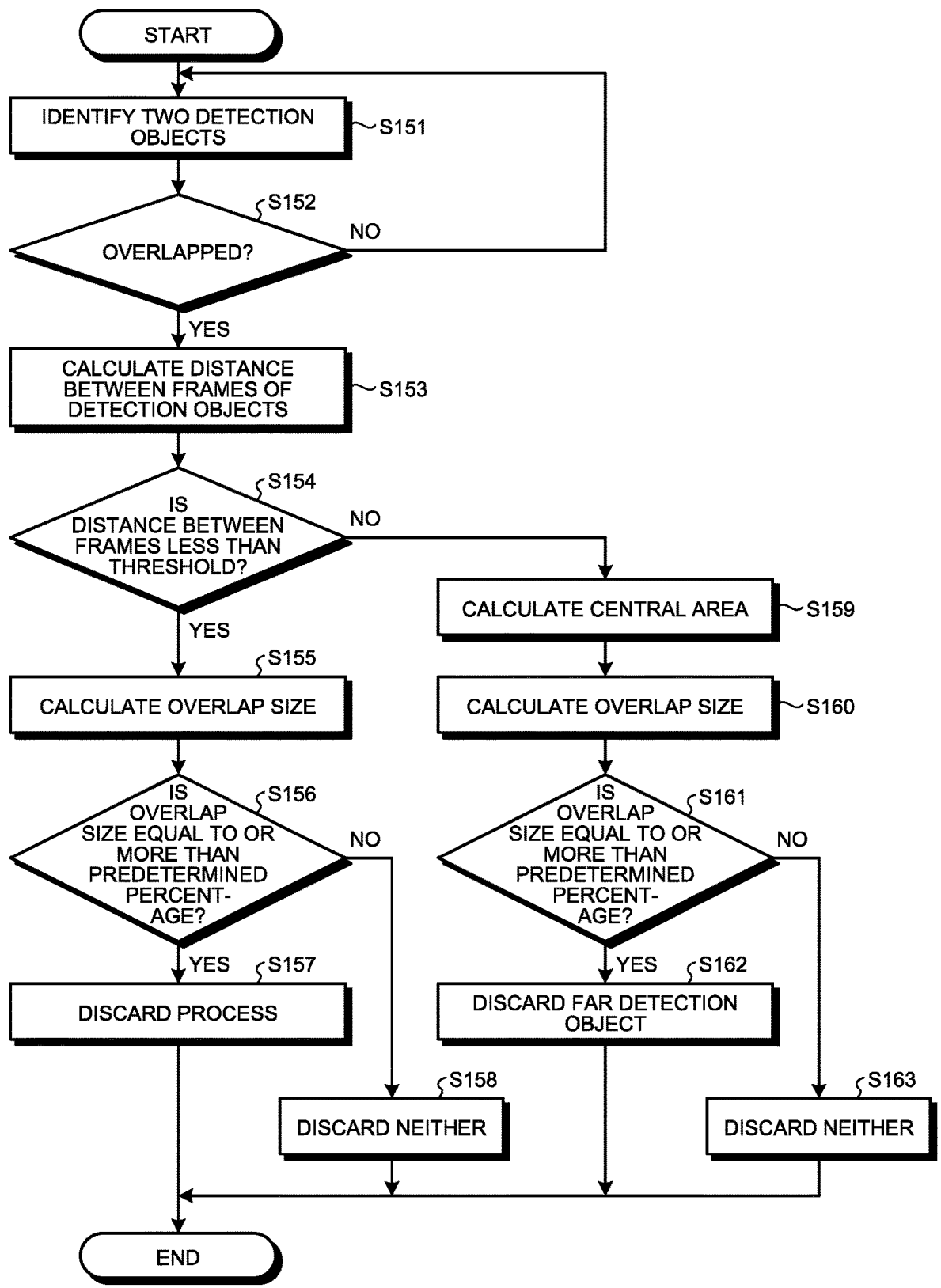
FIG. 19 is a flowchart that illustrates an example of operation during the overlap process by the recognition processing unit according to the embodiment.
Figure 20:
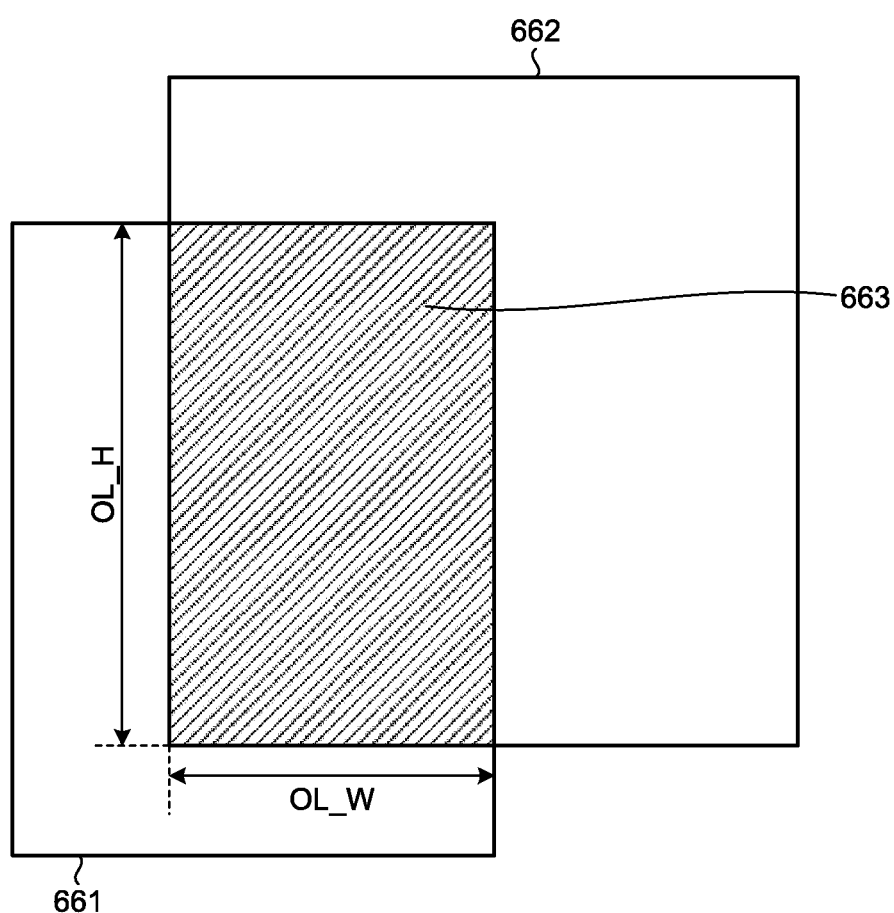
FIG. 20 is a diagram that illustrates an overlap size when the distance between frames is a short distance.
Figure 21:
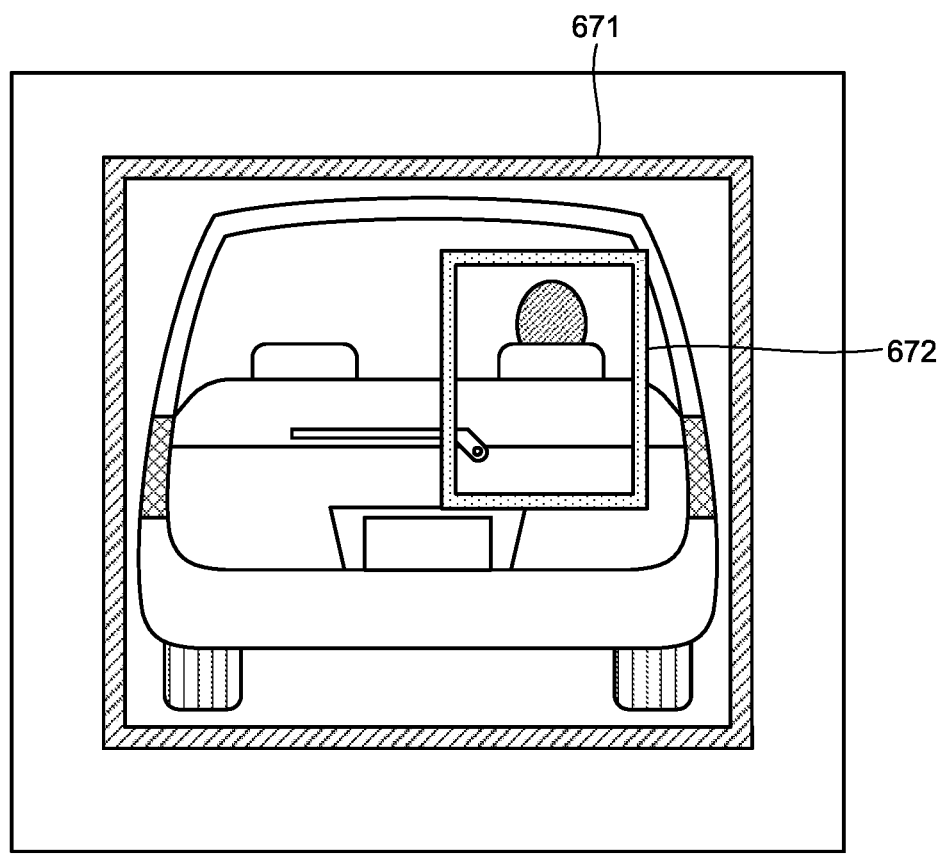
FIG. 21 is a diagram that illustrates operation to discard a detection object when the distance between frames is a short distance.
Figure 22:
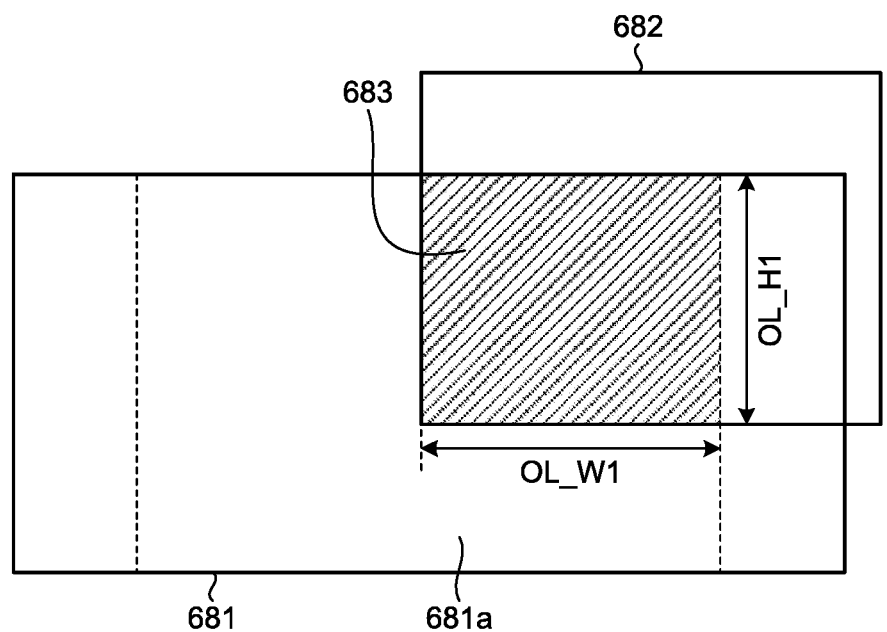
FIG. 22 is a diagram that illustrates an overlap size when the distance between frames is a long distance.
Figure 23:
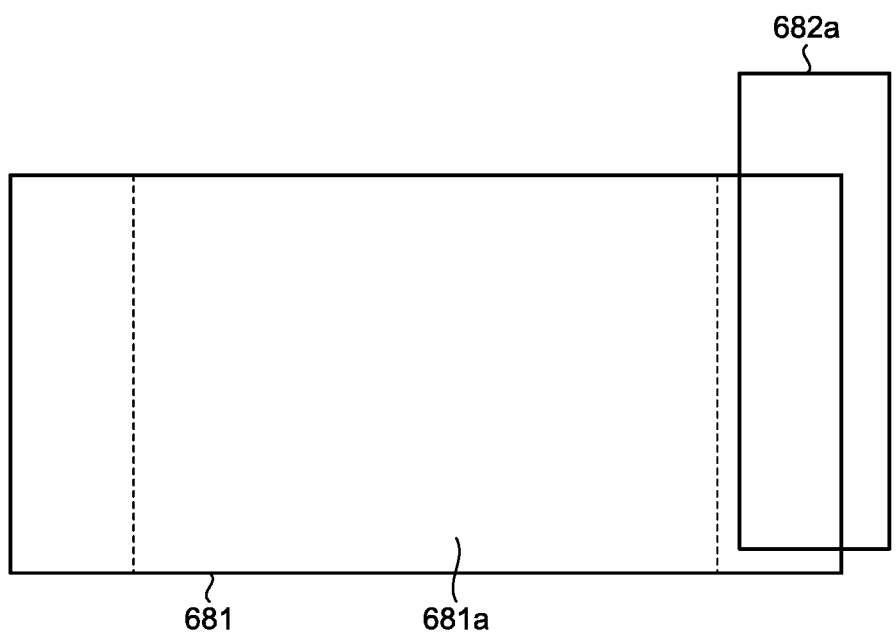
FIG. 23 is a diagram that illustrates a case where there is no overlap size when the distance between frames is a long distance.
Figure 24:
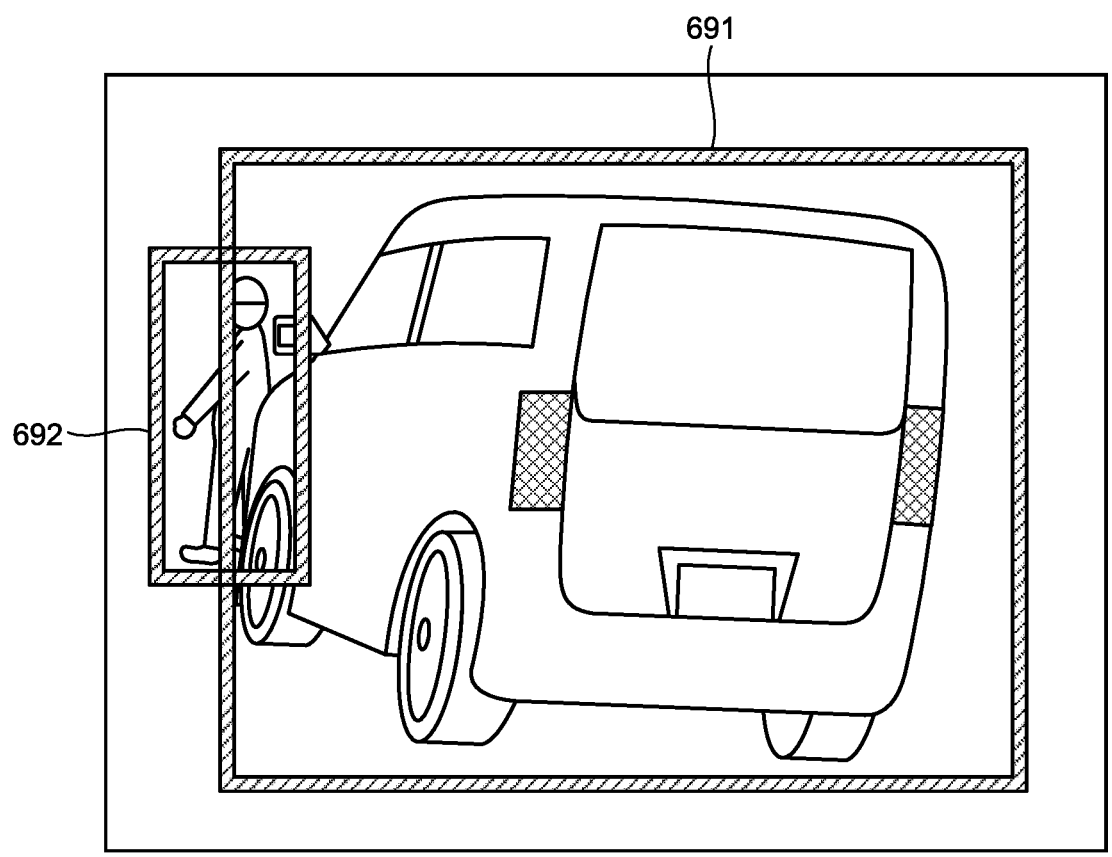
FIG. 24 is a diagram that illustrates a case where a detection object is not discarded when the distance between frames is a long distance.

FIG. 18 is a flowchart that illustrates an example of operation during the object recognition process by the recognition processing unit according to the embodiment. FIG. 19 is a flowchart that illustrates an example of operation during the overlap process by the recognition processing unit according to the embodiment. FIG. 20 is a diagram that illustrates an overlap size when the distance between frames is a short distance. FIG. 21 is a diagram that illustrates operation to discard a detection object when the distance between frames is a short distance. FIG. 22 is a diagram that illustrates an overlap size when the distance between frames is a long distance. FIG. 23 is a diagram that illustrates a case where there is no overlap size when the distance between frames is a long distance. FIG. 24 is a diagram that illustrates a case where a detection object is not discarded when the distance between frames is a long distance. With reference to FIGS. 18 to 24, an explanation is given of the flow of operation during the object recognition process by the recognition processing unit 5 in the object recognition apparatus 1.

Step S11

The second generating unit 501 receives the disparity image Ip from the disparity-value calculation processing unit 300, receives the reference image Ia from the disparity-value deriving unit 3, and generates various images, such as the V map VM, the U map UM, the U map UM_H, and the real U map RM. Then, a transition is made to Step S12.

Step S12

The area extracting unit 511 of the clustering processing unit 502 extracts an isolated area that is a cluster of pixel values from the real U map RM included in the maps (images) output from the second generating unit 501. Furthermore, by using the V map VM, the U map UM, and the real U map RM, the area extracting unit 511 identifies the position of the object at an isolated area and the actual width, height, and depth in the reference image Ia or the disparity image Ip. Then, for each extracted isolated area, the area extracting unit 511 generates recognized-area information that is information about an isolated area and here includes, in the recognized-area information, for example the identification information on labeling processing and information such as the position and the size of an isolated area in the reference image Ia, the V map VM, the U map UM, and the real U map RM. The area extracting unit 511 sends the generated recognized-area information to the frame generating unit 512. Then, a transition is made to Step S13.

Step S13

The frame generating unit 512 of the clustering processing unit 502 is a functional unit that, with regard to the isolated area of an object on the real U map RM extracted by the area extracting unit 511, generates a frame for the detection area of the object that corresponds to the isolated area in the disparity image Ip (or the reference image Ia). The frame generating unit 512 includes the information on the frame generated on the disparity image Ip or the reference image Ia in the recognized-area information and sends it to the first discarding unit 513. Then, a transition is made to Step S14.

Step S14

The first discarding unit 513 of the clustering processing unit 502 determines what the object is on the basis of the actual size (width, height, depth) of the detection object in a detection area based on the size of the detection area indicated with the frame by the frame generating unit 512 and discards it in accordance with the type of object. To discard a detection object, for example, the first discarding unit 513 includes a flag (discard flag) indicating discard in the recognized-area information on the detection object. The first discarding unit 513 includes the discard flag indicating whether the detection object is to be discarded in the recognized-area information and sends it to the overlap processing unit 514. Then, a transition is made to Step S15.

Step S15

When detection areas are overlapped, the overlap processing unit 514 performs an overlap process to determine whether objects in the detection areas are to be discarded on the basis of the size of the overlapped detection areas. The overlap process by the overlap processing unit 514 is explained with reference to FIG. 19.

Step S151

The first determining unit 521 of the overlap processing unit 514 identifies any two detection objects among the detection objects that correspond to pieces of recognized-area information received from the first discarding unit 513. Then, a transition is made to Step S152.

Step S152

The first determining unit 521 determines whether the detection areas of the two identified detection objects are overlapped. When the two detection areas are overlapped (Step S152: Yes), a transition is made to Step S153, and when they are not overlapped (Step S152: No), Step S151 is returned so that the first determining unit 521 identifies two different detection objects.

Step S153

When the first determining unit 521 determines that the detection areas are overlapped, the distance calculating unit 522 of the overlap processing unit 514 calculates the distance between frames of the objects in the overlapped detection areas in a depth direction. Then, a transition is made to Step S154.

Step S154

The second determining unit 523 of the overlap processing unit 514 determines whether the distance between frames calculated by the distance calculating unit 522 is less than a predetermined threshold. When the distance between frames is less than the predetermined threshold, that is, when the distance between frames is a short distance (Step S154: Yes), a transition is made to Step S155, and when it is equal to or more than the predetermined threshold, that is, when the distance between frames is a long distance (Step S154: No), a transition is made to Step S159.

Step S155

When the second determining unit 523 determines that the distance between frames is a short distance, the overlapped-size calculating unit 524 of the overlap processing unit 514 calculates the overlap size of the area where two detection areas are overlapped. For example, as illustrated in FIG. 20, when a detection area 661 and a detection area 662 are overlapped, the overlapped-size calculating unit 524 calculates the size of an overlapped area 663 that is an area overlapped by using (height OL_H)×(width OL_W). Then, a transition is made to Step S156.

Step S156

The third determining unit 525 of the overlap processing unit 514 determines whether the overlap size calculated by the overlapped-size calculating unit 524 is equal to or more than a predetermined percentage of the size of any one of the two detection areas (a threshold with regard to the overlap percentage of the detection areas). When the overlap size is equal to or more than the predetermined percentage of the size of any one of the two detection areas (Step S156: Yes), a transition is made to Step S157, and when it is less than the predetermined percentage (Step S156: No), a transition is made to Step S158.

Step S157

When both the detection objects are vehicles, the second discarding unit 526 of the overlap processing unit 514 does not discard the detection object in a short distance with a high degree of importance as the target for a tracking process but discards the detection object in a long distance. The second discarding unit 526 includes the discard flag indicating non-discard in the recognized-area information on the detection object in a short distance, includes the discard flag indicating discard in the recognized-area information on the detection object in a long distance, and sends them to the tracking unit 503.

Conversely, when one of the two detection objects is a vehicle and the other one is not a vehicle and is an object whose size is smaller than a vehicle, the second discarding unit 526 does not discard the detection object that is a vehicle but discards the detection object that is not a vehicle and has a size smaller than vehicles. There is a high possibility that a detection object that is not a vehicle and has a size smaller than a vehicle is, for example, part of the vehicle that is improperly detected as a pedestrian and therefore it is discarded. For example, as illustrated in FIG. 21, when the distance between frames in the detection area indicated by a detection frame 671 and the detection area indicated by a detection frame 672 is a short distance, and when the detection object indicated by the detection frame 671 is a vehicle and the detection object indicated by the detection frame 672 is an object other than vehicles (a person in the vehicle in FIG. 21), the second discarding unit 526 does not discard the vehicle indicated by the detection frame 671 but discards the detection object indicated by the detection frame 672. The second discarding unit 526 includes the discard flag indicating non-discard in the recognized-area information on the detection object that is a vehicle, includes the discard flag indicating discard in the recognized-area information on the detection object that is not a vehicle, and sends it to the tracking unit 503.

Step S158

When the third determining unit 525 determines that the overlap size is smaller than the predetermined percentage of the size of any one of the two detection areas, the second discarding unit 526 determines that the objects in the detection areas have a high degree of importance as the target for a tracking process and does not discard any of the detection objects. The second discarding unit 526 includes the discard flag indicating non-discard in the recognized-area information on each of the two detection objects and sends it to the tracking unit 503.

Step S159

When the second determining unit 523 determines that the distance between frames is a long distance, the overlapped-size calculating unit 524 calculates a central area (an example of a partial area) of the detection area with the detection object in a short distance, included in the two detection areas. Specifically, as illustrated in FIG. 22, the overlapped-size calculating unit 524 calculates for example a central area 681a that has the size of a central area in a horizontal direction (e.g., an area with 80[%] of the width in a horizontal direction) with regard to the detection area 681 whose detection object is closer, included in the two detection areas 681, 682. Although the overlapped-size calculating unit 524 calculates the central area of the detection area with the detection object in a short distance, this is not a limitation and, for example, the area with a predetermined percentage (e.g., 85[%]) from the extreme right of the detection area may be calculated. Then, a transition is made to Step S160.

Step S160

The overlapped-size calculating unit 524 calculates the overlap size of the area where the central area of the detection area with the detection object in a short distance and the detection area with the detection object in a long distance are overlapped, included in the two detection areas. For example, as illustrated in FIG. 22, when the central area 681a of the detection area 681 is overlapped with the detection area 682, the overlapped-size calculating unit 524 calculates the size of an overlapped area 683 that is an area overlapped by using (height OL_H1)×(width OL_W1). Then, a transition is made to Step S161.

Step S161

The third determining unit 525 determines whether the overlap size calculated by the overlapped-size calculating unit 524 is equal to or more than a predetermined percentage (a threshold with regard to an overlap percentage) of the size of any one of the central area of the detection area with the detection object in a short distance and the detection area with the detection object in a long distance. When the overlap size is equal to or more than the predetermined percentage of the size of any one of them (Step S161: Yes), a transition is made to Step S162, and when it is less than the predetermined percentage (Step S161: No), a transition is made to Step S163.

Step S162

With respect to two detection objects, the second discarding unit 526 does not discard the detection object in a short distance with a high degree of importance as the target for a tracking process but discards the detection object in a long distance. In the example illustrated in FIG. 22, when the size (overlap size) of the overlapped area 683 is equal to or more than the predetermined percentage of the size of the central area 681a or the detection area 682, the second discarding unit 526 does not discard the detection object in the detection area 681 that is in a short distance but discards the detection object in the detection area 682 that is in a long distance. The second discarding unit 526 includes the discard flag indicating non-discard in the recognized-area information on the detection object in a short distance, includes the discard flag indicating discard in the recognized-area information on the detection object in a long distance, and sends them to the tracking unit 503.

Step S163

When the third determining unit 525 determines that the overlap size is less than the predetermined percentage of the size of any one of the central area of the detection area with the detection object in a short distance and the detection area with the detection object in a long distance, the second discarding unit 526 determines that the objects in both the detection areas have a high degree of importance as the target for a tracking process and does not discard any of the detection objects. That is, when it is simply determined that the overlap size of two detection areas is equal to or more than the predetermined percentage of the size of any one of the two detection areas, there is a possibility that the detection object in a long distance is discarded; however, as the overlap size is obtained with respect to the central area of the detection area in a short distance, it is possible to prevent a detection object (e.g., pedestrian) in a long distance which should not be discarded from being discarded although the detection areas are overlapped near the end. The second discarding unit 526 includes the discard flag indicating non-discard in the recognized-area information on each of the two detection objects and sends it to the tracking unit 503.

For example, in the example illustrated in FIG. 23, although the two detection areas 681, 682a are overlapped, the central area 681a of the detection area 681 is not overlapped with the detection area 682a, and therefore the third determining unit 525 determines that the overlap size is less than the predetermined percentage of the size of any one of the central area of the detection area of the detection object in a short distance and the detection area of the detection object in a long distance. In this case, the second discarding unit 526 determines that the detection objects in both the detection areas 681, 682a have a high degree of importance as the target for a tracking process and does not discard any of the detection objects.

Furthermore, as illustrated in FIG. 24, for example, when the distance between frames in the detection area indicated by a detection frame 691 and the detection area indicated by the detection frame 692 is a long distance and the third determining unit 525 determines that the overlap size is less than the predetermined percentage of the size of any one of the central area of the detection area in the detection frame 691 with the detection object in a short distance and the detection area in the detection frame 692 with the detection object in a long distance, the second discarding unit 526 does not discard the detection objects indicated by the detection frames 691, 692.

After the process at Step S157, S158, S162, or S163 is finished, a transition is made to Step S16.

Step S16

The tracking unit 503 performs a tracking process on a detection object whose discard flag is off on the basis of the recognized-area information that is information about an object detected by the clustering processing unit 502. The tracking unit 503 outputs the recognized-area information including a result of the tracking process as recognition information to the vehicle control device 6 (see FIG. 3).

As described above, the object recognition process is conducted during the process at Steps S11 to S16 illustrated in FIG. 18, and, at Step S15, the overlap process is conducted during the process at Steps S151 to S163 illustrated in FIG. 19.

As described above, the distance between frames of the detection areas of two detected objects is calculated, the method of calculating the size of the overlapped area with respect to the detection areas of the two objects is switched in accordance with the distance between frames, and it is determined whether the detection object is to be discarded in accordance with the size. Thus, a discard process may be properly conducted. That is, according to the present embodiment, it is possible to discard objects that need to be discarded and refrain from discarding objects that do not need to be discarded other than vehicles.

Furthermore, when the distance between frames is a long distance, the central area of the detection area with the detection object in a short distance, included in the two detection areas, is calculated, the overlap size of the area where the central area is overlapped with the detection area with the detection object in a long distance is calculated, it is determined whether it is equal to or more than the predetermined percentage of the size of any one of the central area and the detection area with the detection object in a long distance, and when it is less than that, the two detection objects are not discarded. Thus, when it is simply determined whether the overlap size of two detection areas is equal to or more than the predetermined percentage of the size of any one of the two detection areas, there is a possibility that the detection object in a long distance is discarded; however, as the overlap size is obtained with respect to the central area of the detection area in a short distance, it is possible to prevent a detection object (e.g., pedestrian) in a long distance which should not be discarded from being discarded although the detection areas are overlapped near the end.

Furthermore, when the distance between frames is a short distance, the size of the area where the two detection areas are overlapped is calculated, it is determined whether it is equal to or more than the predetermined percentage of the size of any one of the two detection areas, and when it is equal to or more than that and when one of the two detection objects is a vehicle and the other one is not a vehicle and it is an object smaller than a vehicle, the detection object that is a vehicle is not discarded and the detection object that is not a vehicle and is smaller than a vehicle is discarded. Thus, objects that are not vehicles may be discarded accurately as there is a high possibility of false detection.

Furthermore, according to the above-described embodiment, the cost value C is an evaluation value representing a degree of dissimilarity; however, it may be an evaluation value representing a degree of similarity. In this case, the shift amount d with which the cost value C, the degree of similarity, becomes maximum (extreme value) is the disparity value dp.

Furthermore, according to the above-described embodiment, although the object recognition apparatus 1 installed in an automobile that is the vehicle 70 is explained, this is not a limitation. For example, it may be installed in other examples of vehicles, such as bikes, bicycles, wheelchairs, or cultivators for agricultural use. Furthermore, it may be not only a vehicle that is an example of a movable body, but also a movable body such as a robot.

Furthermore, according to the above-described embodiment, when at least any of functional units of the disparity-value deriving unit 3 and the recognition processing unit 5 in the object recognition apparatus 1 is implemented by executing a program, the program is provided by being previously installed in a ROM, or the like. Furthermore, a configuration may be such that a program executed by the object recognition apparatus 1 according to the above-described embodiment is provided by being stored, in the form of a file that is installable and executable, in a recording medium readable by a computer, such as a CD-ROM, a flexible disk (FD), a CD-R (compact disk recordable), or a DVD (digital versatile disk). Furthermore, a configuration may be such that the program executed by the object recognition apparatus 1 according to the above-described embodiment is stored in a computer connected via a network such as the Internet and provided by being downloaded via the network. Moreover, a configuration may be such that the program executed by the object recognition apparatus 1 according to the above-described embodiment is provided or distributed via a network such as the Internet. Furthermore, the program executed by the object recognition apparatus 1 according to the above-described embodiment has a modular configuration that includes at least any of the above-described functional units, and in terms of actual hardware, the CPU 52 (the CPU 32) reads the program from the above-described ROM 53 (the ROM 33) and executes it so as to load and generate the above-described functional units in a main storage device (the RAM 54 (the RAM 34), or the like).

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus, comprising:
   calculating circuitry configured to calculate a distance between two object, detected based on distance information on the objects that are overlapped in detection areas of the objects, in a depth direction in the detection areas; and
   discarding circuitry configured to determine whether at least one of the two objects in the detection areas is to be discarded by using a method that corresponds to the distance calculated by the calculating circuitry,
   wherein the calculating circuitry includes:
   a first calculating circuitry configured to calculate a distance between two objects, detected based on distance information on the objects, in a depth direction in detection areas of the objects; and
   a second calculating circuitry configured to calculate an overlap size that is a size of an overlapped area with regard to the two detection areas by using a method that corresponds to the distance calculated by the first calculating circuitry, and
   wherein the discarding circuitry is configured to determine whether the at least one of the two objects in the detection areas is to be discarded in accordance with the overlap size calculated by using the method that corresponds to the distance.

2. The information processing apparatus according to claim 1 further comprising:
   determining circuitry configured to determine whether the distance calculated by the first calculating circuitry is included in a first distance range or included in a second distance range that is farther than the first distance range, wherein
   when the determining circuitry determines that the distance is included in the second distance range, the second calculating circuitry calculates, as the overlap size, a size of an area where a partial area of the detection area of a closer one of the objects is overlapped with the detection area of a farther one of the objects, included in the two detection areas, and
   when the overlap size is less than a predetermined percentage of a size of any one of the partial area and the detection area of the farther one of the objects, the discarding circuitry discards neither the closer one of the objects nor the farther one of the objects.

3. The information processing apparatus according to claim 2, wherein when the determining circuitry determines that the distance is included in the second distance range, the second calculating circuitry obtains, as the partial area, a predetermined central area in a horizontal direction of the detection area of the closer one of the objects and calculates, as the overlap size, a size of an area where the central area is overlapped with the detection area of the farther one of the objects.

4. The information processing apparatus according to claim 2, wherein when the overlap size is equal to or more than the predetermined percentage of the size of any one of the partial area and the detection area of the farther one of the objects, the discarding circuitry does not discard the closer one of the objects but discards the farther one of the objects.

5. The information processing apparatus according to claim 2, wherein
   the determining circuitry determines that the distance is included in the first distance range, the second calculating circuitry calculates, as the overlap size, a size of an area where the two detection areas are overlapped, and
   when the overlap size is equal to or more than a predetermined percentage of a size of any one of the two detection areas and when one of the two detection areas represents a vehicle and another one represents an object other than a vehicle, the discarding circuitry does not discard an object that is a vehicle but discards an object that is other than a vehicle.

6. The information processing apparatus according to claim 5, wherein when the overlap size is equal to or more than a predetermined percentage of a size of any one of the two detection areas and when both the detection areas represent a vehicle, the discarding circuitry does not discard the closer one of the objects, included in the objects indicated by the two detection areas, but discards the farther one of the objects.

7. The information processing apparatus according to claim 5, wherein when the overlap size is less than a predetermined percentage of a size of any one of the two detection areas, the discarding circuitry discards neither the closer one of the objects nor the farther one of the objects, included in the objects indicated by the two detection areas.

8. The information processing apparatus according to claim 1, further comprising:
extracting circuitry configured to extract an isolated area indicating an object based on the distance information; and
determining circuitry configured to determine the detection area by generating a frame for the isolated area.

9. An object recognition apparatus comprising:
first imaging circuitry configured to obtain a first captured image by capturing an image of an object;
second imaging circuitry that is located at a position different from a position of the first imaging circuitry and that is configured to obtain a second captured image by capturing an image of the object;
generating circuitry configured to generate the distance information in accordance with a disparity value obtained from the first captured image and the second captured image with respect to the object; and
the information processing apparatus according to claim 1.

10. A device control system comprising:
the object recognition apparatus according to claim 9; and
control circuitry configured to control a control target based on information about an object detected by the object recognition apparatus.

11. A movable body comprising the device control system according to claim 10.

12. The information processing apparatus according to claim 1, wherein:
the discarding circuitry configured to determine performs a determining of whether each of the two objects in the detection areas is to be discarded.

13. An image processing method comprising:
calculating a distance between two objects, detected based on distance information on the objects that are overlapped in detection areas of the objects, in a depth direction in the detection areas; and
discarding by determining whether at least one of the objects in the detection areas is to be discarded by using a method that corresponds to the distance calculated and discarding the at least one of the objects which is determined to be in the detection area,
wherein the calculating includes:
a first calculating of a distance between two objects, detected based on distance information on the objects, in a depth direction in detection areas of the objects; and
a second calculating of an overlap size that is a size of an overlapped area with regard to the two detection areas by using a method that corresponds to the distance calculated by the first calculating, and
wherein the discarding is configured to determine whether the at least one of the objects in the detection areas is to be discarded in accordance with the overlap size that has been calculated.

14. The method according to claim 13, further comprising:
determining whether the distance calculated by the first calculating is included in a first distance range or included in a second distance range that is farther than the first distance range, wherein
when the determining whether the distance calculated determines that the distance is included in the second distance range, the second calculating calculates, as the overlap size, a size of an area where a partial area of the detection area of a closer one of the objects is overlapped with the detection area of a farther one of the objects, included in the two detection areas, and
when the overlap size is less than a predetermined percentage of a size of any one of the partial area and the detection area of the farther one of the objects, the discarding discards neither the closer one of the objects nor the farther one of the objects.

15. The method according to claim 14, wherein when the determining determines that the distance is included in the second distance range, the second calculating obtains, as the partial area, a predetermined central area in a horizontal direction of the detection area of the closer one of the objects and calculates, as the overlap size, a size of an area where the central area is overlapped with the detection area of the farther one of the objects.

16. The method according to claim 14, wherein when the overlap size is equal to or more than the predetermined percentage of the size of any one of the partial area and the detection area of the farther one of the objects, the discarding does not discard the closer one of the objects but discards the farther one of the objects.

17. The method according to claim 13, wherein:
the discarding performs a determining of whether each of the two objects in the detection areas is to be discarded.

18. A non-transitory computer-readable recording medium that contains a computer program that causes a computer to execute:
calculating a distance between two objects, detected based on distance information on the objects that are overlapped in detection areas of the objects, in a depth direction in the detection areas; and
discarding by determining whether at least one of the objects in the detection areas is to be discarded by using a method that corresponds to the distance calculated and discarding the at least one of the objects which is determined to be in the detection area,
wherein the calculating includes:
a first calculating of a distance between two objects, detected based on distance information on the objects, in a depth direction in detection areas of the objects; and
a second calculating of an overlap size that is a size of an overlapped area with regard to the two detection areas by using a method that corresponds to the distance calculated by the first calculating, and
wherein the discarding includes determining whether the at least one of the objects in the detection areas is to be discarded in accordance with the overlap size that has been calculated.

19. The non-transitory computer-readable recording medium according to claim 18, wherein:

the discarding performs a determining of whether each of the two objects in the detection areas is to be discarded.

* * * * *